United States Patent
VanAusdall

(10) Patent No.: US 12,213,936 B2
(45) Date of Patent: Feb. 4, 2025

(54) WRAP AROUND WALKING AID

(71) Applicant: A Better Walker, LLC, Loveland, CO (US)

(72) Inventor: Jack Paul VanAusdall, Loveland, CO (US)

(73) Assignee: A Better Walker, LLC, Loveland, CO (US)

( * ) Notice: Subject to any disclaimer, the term of this patent is extended or adjusted under 35 U.S.C. 154(b) by 0 days.

(21) Appl. No.: 18/124,743

(22) Filed: Mar. 22, 2023

(65) Prior Publication Data

US 2024/0050303 A1    Feb. 15, 2024

Related U.S. Application Data

(63) Continuation of application No. 16/896,609, filed on Jun. 9, 2020, now Pat. No. 11,622,908, which is a
(Continued)

(51) Int. Cl.
| | |
|---|---|
| *B62B 3/00* | (2006.01) |
| *A61H 3/04* | (2006.01) |
| *B62B 5/04* | (2006.01) |
| *A61H 3/00* | (2006.01) |
| *B62B 3/02* | (2006.01) |

(52) U.S. Cl.
CPC ............ *A61H 3/04* (2013.01); *B62B 5/0438* (2013.01); *A61H 2003/006* (2013.01); *A61H 2003/046* (2013.01); *A61H 2201/0161* (2013.01); *A61H 2201/1633* (2013.01); *B62B 3/02* (2013.01)

(58) Field of Classification Search
CPC ...... A61H 3/04; A61H 3/00; A61H 2003/046; A61H 2003/006; A61H 2003/002; A61H 2201/0161; A61H 2201/1633; A61H 2201/1623; A61H 2201/5053; A61H 2201/0192; A61H 2201/1635; B62B 5/0438; B62B 5/04; B62B 5/0485; B62B 3/02; B62B 3/00
See application file for complete search history.

(56) References Cited

U.S. PATENT DOCUMENTS

| | | | | |
|---|---|---|---|---|
| 4,341,381 A | * | 7/1982 | Norberg | A61H 3/04 135/67 |
| 4,643,211 A | * | 2/1987 | Morris | A61H 3/04 D12/130 |

(Continued)

*Primary Examiner* — James M Dolak
(74) *Attorney, Agent, or Firm* — Polsinelli PC

(57) ABSTRACT

A walking aid that assists a user in walking in an upright position. The walking aid may include a rear lower frame structure, a front lower frame structure, a first front wheel coupled to a first front lower frame member, a second front wheel coupled to a second front lower frame member, a first rear wheel coupled to the first rear lower frame member, a second rear wheel coupled to the second rear lower frame member, an upper frame structure comprising a first upper frame member, a second upper frame member, a first forearm support, and a second forearm support, a first pivot and latch mechanism pivotally coupling the first upper frame member and the first rear lower frame member together, and a second pivot and latch mechanism pivotally coupling the second upper frame member and the second rear lower frame member together.

11 Claims, 18 Drawing Sheets

Related U.S. Application Data continuation of application No. 16/358,026, filed on Mar. 19, 2019, now Pat. No. 10,675,207, which is a continuation-in-part of application No. 15/582,207, filed on Apr. 28, 2017, now Pat. No. 10,292,893, which is a continuation-in-part of application No. PCT/US2015/048073, filed on Sep. 2, 2015, which is a continuation of application No. 14/532,448, filed on Nov. 4, 2014, now Pat. No. 9,314,395.

(60) Provisional application No. 62/650,914, filed on Mar. 30, 2018.

(56) References Cited

U.S. PATENT DOCUMENTS

| | | | | |
|---|---|---|---|---|
| 5,020,560 | A * | 6/1991 | Turbeville | A61H 3/04 280/282 |
| 5,499,856 | A * | 3/1996 | Sorrell | A61H 3/04 135/66 |
| 5,702,326 | A * | 12/1997 | Renteria | A61H 3/04 135/67 |
| 5,716,063 | A * | 2/1998 | Doyle | A61H 3/04 135/67 |
| 7,052,030 | B2 * | 5/2006 | Serhan | B60T 1/04 280/647 |
| 7,111,856 | B1 * | 9/2006 | Graham | A61G 5/125 280/304.5 |
| 8,251,079 | B1 * | 8/2012 | Lutz | A61H 3/04 135/67 |
| 8,468,622 | B2 * | 6/2013 | Purwar | A61G 7/1017 5/86.1 |
| 9,226,868 | B2 * | 1/2016 | Andersen | A61H 3/04 |
| 9,289,347 | B2 * | 3/2016 | Powell | A61H 3/04 |
| 9,585,807 | B2 * | 3/2017 | Fellingham | A61H 3/04 |
| 9,662,264 | B2 * | 5/2017 | Jacobs | A61H 3/04 |
| 10,639,226 | B1 * | 5/2020 | Keyes | A61H 1/00 |
| 10,675,207 | B2 * | 6/2020 | VanAusdall | B62B 5/0438 |
| 10,772,788 | B2 * | 9/2020 | Kapec | A61H 3/04 |
| 10,828,226 | B2 * | 11/2020 | Fellingham | A61H 3/04 |
| 10,973,730 | B2 * | 4/2021 | Fellingham | A61H 1/00 |
| 11,071,676 | B2 * | 7/2021 | Fellingham | A61H 1/00 |
| 11,510,842 | B2 * | 11/2022 | Rohloff | A61H 3/04 |
| 11,510,843 | B2 * | 11/2022 | Zibley | A61H 3/04 |
| 11,622,908 | B2 * | 4/2023 | VanAusdall | B62B 5/0438 280/647 |
| 11,633,321 | B2 * | 4/2023 | Miller | A61H 3/04 280/650 |
| 11,771,614 | B2 * | 10/2023 | Keene | A47D 13/043 297/5 |
| 11,806,304 | B1 * | 11/2023 | Turner | A61H 3/04 |
| 11,963,921 | B2 * | 4/2024 | Harden | A61H 3/04 |
| 12,090,115 | B2 * | 9/2024 | Liu | A61G 5/101 |
| 2005/0156395 | A1 * | 7/2005 | Bohn | A61H 3/04 280/87.021 |
| 2007/0267835 | A1 * | 11/2007 | Huang | A61H 3/04 280/87.05 |

* cited by examiner

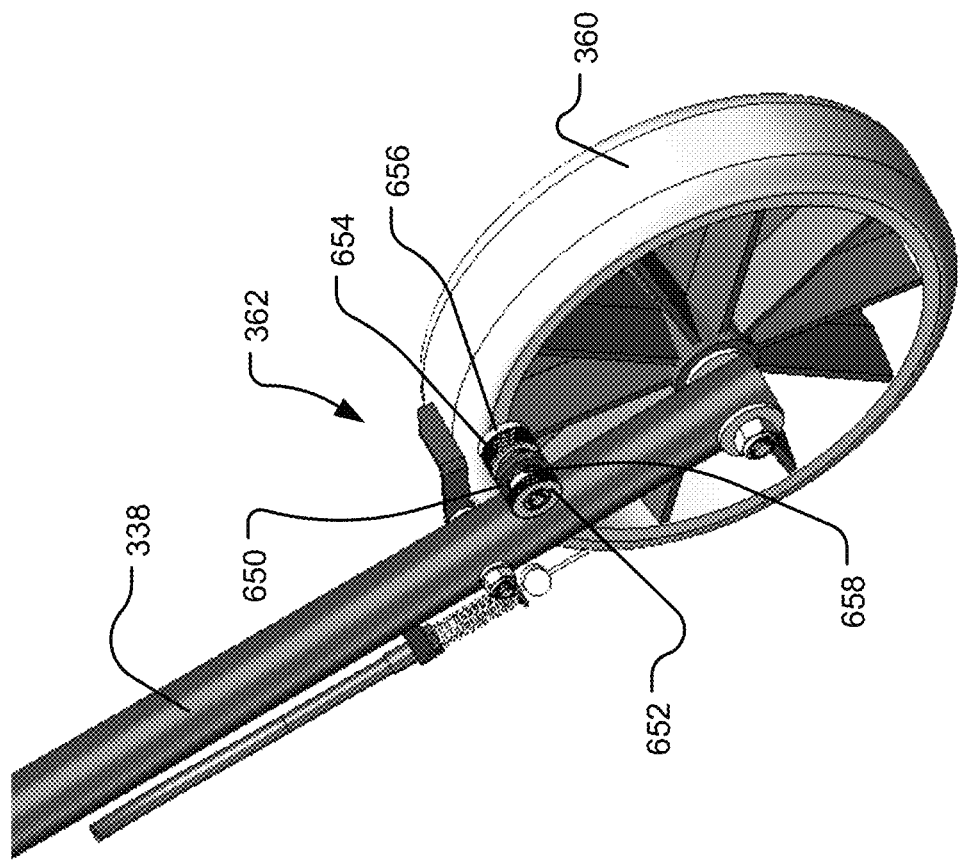
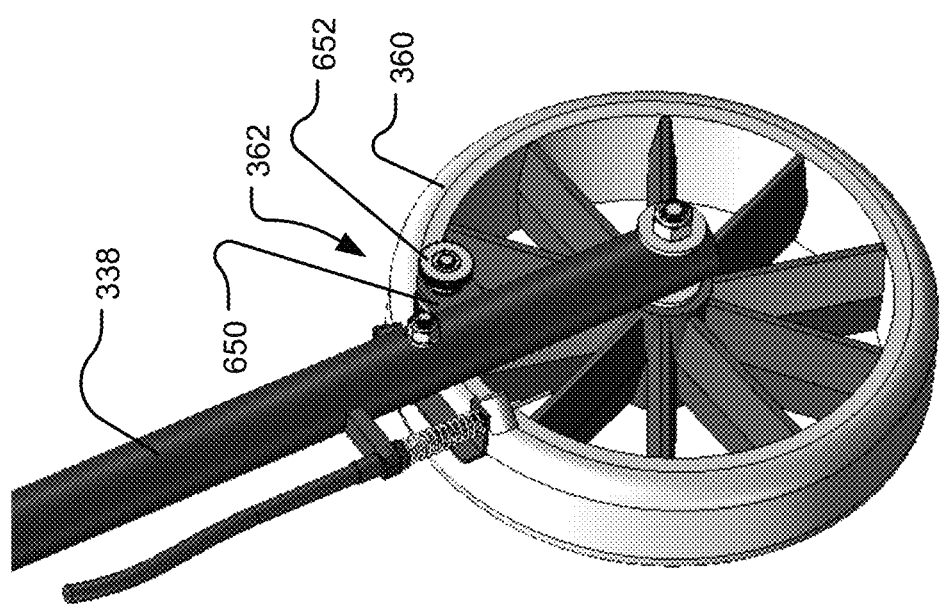
FIG. 14B
FIG. 14A

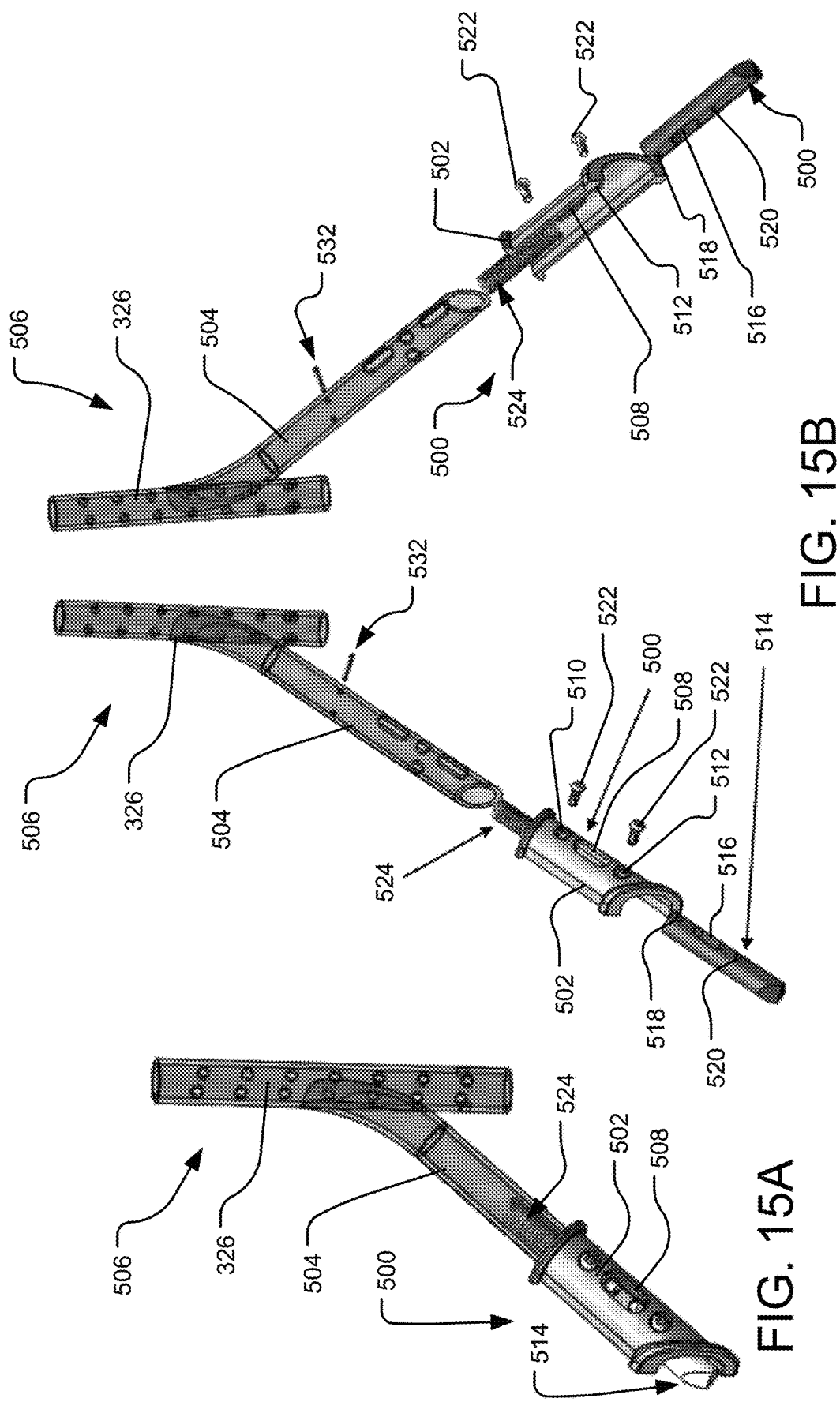

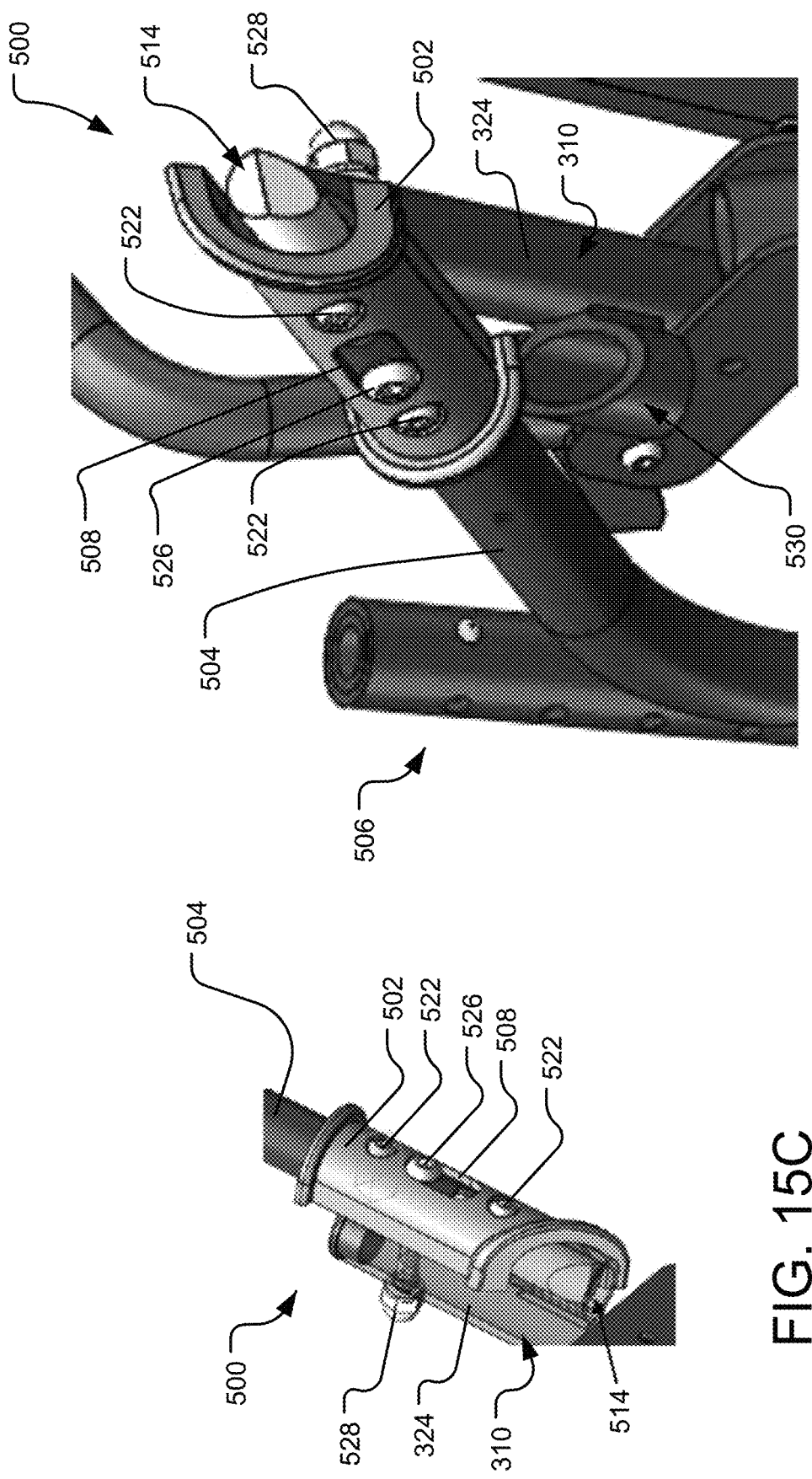

WRAP AROUND WALKING AID

CROSS-REFERENCE TO RELATED APPLICATIONS

The present application is a continuation of U.S. patent application Ser. No. 16/896,609 filed Jun. 9, 2020, which application is a continuation of U.S. patent application Ser. No. 16/358,026 filed Mar. 19, 2019, now U.S. Pat. No. 10,675,207, which application claims the benefit under 35 U.S.C. § 119(e) of U.S. Provisional Application 62/650,914 filed Mar. 30, 2018 and titled "Wrap Around Walking Aid". application Ser. No. 16/358,026 is also a continuation-in-part application of U.S. patent application Ser. No. 15/582,207, filed Apr. 28, 2017, now U.S. Pat. No. 10,292,893, and entitled "WRAP AROUND WALKING AID". U.S. patent application Ser. No. 15/582,207 is a continuation-in-part application of International Application PCT/US2015/048073, entitled "Wrap Around Walking Aid," filed on Sep. 2, 2015, which claims the benefit of and priority to U.S. patent application Ser. No. 14/532,448, entitled "Wrap Around Walking Aid," filed Nov. 4, 2014, now U.S. Pat. No. 9,314,395. All the aforementioned applications are incorporated by reference in their entireties.

TECHNICAL FIELD

The present disclosure relates to walking aids that assist those with mobility difficulties, and, more particularly, upright walking aids that wrap around a user's body.

BACKGROUND

Prior to embodiments of the disclosed invention, conventional walkers caused people to have a bent forward low back and neck in extension posture. This caused neck and back pain. They also had break handles that could cause the wrist to be bent in an abnormal way that can could wrist and elbow pain. Conventional walkers also inhibited a normal gait pattern. Embodiments of the disclosed invention solve these problems. Conventional walkers' forward leaning posture has been shown to contribute to falls. With a more upright posture along with the forearm support of this embodiment this should reduce this problem.

SUMMARY

A wrap around walking aid is configured to assist a human user in walking. The wrap around walking aid can include a first rear lower frame and a first front lower frame mechanically coupled to a first upper frame. At least one first fixed front wheel can be mechanically coupled to the first front lower frame. At least one first castor rear wheel can be mechanically coupled to the first rear lower frame. A back rest can be connected to the first rear lower frame. A second rear lower frame and a second front lower frame can be mechanically coupled to a second upper frame. The second rear lower frame can be further mechanically coupled to the back rest. At least one second fixed front wheel can be mechanically coupled to the second front lower frame. At least one second castor rear wheel can be mechanically coupled to the second rear lower frame. The at least one first castor rear wheel, the at least one second castor rear wheel, the at least one first fixed front wheel and the at least one second fixed front wheel can enable a turn radius while the human user is walking forward.

In some embodiments, a first folding point can be arranged between the first front lower frame and the first rear lower frame. The first folding point can be configured to permit the first front lower frame to fold upon the first rear lower frame. A second folding point can be arranged between the second front lower frame and the second rear lower frame. The second folding point can be configured to permit the second front lower frame to fold upon the second rear lower frame.

In some embodiments, at least one first strut can be connected to the first rear lower frame and the first front lower frame. The at least one first strut can be configured to limit the first front lower frame moving away from the first rear lower frame. At least one second strut can be connected to the second rear lower frame and the second front lower frame. The at least one second strut can be configured to limit the second front lower frame moving away from the second rear lower frame.

In some embodiments, a seat rest can be mechanically coupled to the first front lower frame and the second front lower frame. A seat pivot can be attached to a seat and the back rest. Rotating the seat from the seat pivot can cause the seat to rest upon the seat rest.

In some embodiments, the first upper frame can further comprise a first telescoping segment, configured to extend from within the first rear lower frame and further configured to be tightened into place by a first height adjustment. The first telescoping segment can be on a first telescoping axis. A first forearm support segment can be joined to the first telescoping segment. The first forearm support segment can extend on a first forearm axis. Measured from the first telescoping segment, the first forearm support segment can be arranged at a first obtuse angle that is greater than 90 degrees. A first handle segment can be joined to the first forearm support segment.

In some embodiments, a first handle can be mechanically coupled to the first handle segment. A first hand brake can be mechanically coupled to the first handle. A first brake cable can be connected to the first hand brake and the at least one first fixed front wheel. Squeezing the first hand brake can engage the first brake cable to stop motion of the at least one first fixed front wheel. In some embodiments, a first forearm rest can be mechanically coupled to the first forearm support segment.

In some embodiments, the second upper frame can further comprise a second telescoping segment, configured to extend from within the second rear lower frame and further configured to be tightened into place by a second height adjustment. The second telescoping segment can be on a second telescoping axis. A second forearm support segment can be joined to the second telescoping segment. The second forearm support segment can extend on a second forearm axis. Measured from the second telescoping segment, the second forearm support segment can be arranged at a second obtuse angle that is greater than 90 degrees. A second handle segment can be joined to the second forearm support segment.

In some embodiments, a second handle can be mechanically coupled to the second handle segment. A second hand brake can be mechanically coupled to the second handle. A second brake cable can be connected to the second hand brake and the at least one second fixed front wheel. Squeezing the second hand brake can engage the second brake cable to stop motion of the at least one second fixed front wheel. In some embodiments, a second forearm rest can be mechanically coupled to the second forearm support segment.

Aspects of the present disclosure may involve a wrap-around walking aid that assists a user in walking in an upright position. The wrap around walking aid may include: a rear lower frame structure including first and second rear lower frame members; a front lower frame structure including first and second front lower frame members, the first front lower frame member coupled to the first rear lower frame member, the second front lower frame member coupled to the second rear lower frame member; a first front wheel coupled to the first front lower frame member; a second front wheel coupled to the second front lower frame member; a first rear wheel coupled to the first rear lower frame member; a second rear wheel coupled to the second rear lower frame member; an upper frame structure including a first upper frame member, a second upper frame member, a first forearm support coupled to the first upper frame member, a second forearm support coupled to the second upper frame member, a first handle joined with the first upper frame member, and a second handle joined with the second upper frame member, the first upper frame member being adjustably coupled to the first rear lower frame member along a first length of the first upper frame member, the second upper frame member being adjustably coupled to the second rear lower frame member along a second length of the second upper frame member; and a back rest coupled to the rear lower frame structure and extending between the first and second rear lower frame members.

In certain instances, the wrap around walking aid may further include a seat operably coupled to and pivotal relative to the rear lower frame structure so as to be pivotally positioned in a seated position or a stowed position.

In certain instances, the wrap around walking aid may further include a seat rest coupled between the first and second front lower frame members, the seat rest supporting the seat when the seat may be in the seated position.

In certain instances, the upper frame structure further includes first and second brakes, the first brake joined with the first upper frame member near the first handle, the second brake joined with the second upper frame member near the second handle.

In certain instances, the first upper frame member may be adjustably coupled to the first rear lower frame member along the first length of the first upper frame member via a first telescoping connection, the second upper frame member may be adjustably coupled to the second rear lower frame member along the second length of the second upper frame member via a second telescoping connection.

In certain instances, the wrap around walking aid may further include first and second folding joints, the first folding joint joining the first front lower frame member and the first rear lower frame member, the second folding joint joining the second front lower frame member and the second rear lower frame member.

In certain instances, the wrap around walking aid may further include first and second collapsible struts, the first collapsible strut coupling the first front lower frame member and the first rear lower frame member, the second collapsible strut coupling the second front lower frame member and the second rear lower frame member.

Aspects of the present disclosure may involve a wrap-around walking aid that assists a user in walking in an upright position. The wrap around walking aid may include: a rear lower frame structure including first and second rear lower frame members; a front lower frame structure including first and second front lower frame members, the first front lower frame member coupled to the first rear lower frame member, the second front lower frame member coupled to the second rear lower frame member; a first front wheel coupled to the first front lower frame member; a second front wheel coupled to the second front lower frame member; a first rear wheel coupled to the first rear lower frame member; a second rear wheel coupled to the second rear lower frame member; an upper frame structure including a first upper frame member, a second upper frame member, a first forearm support coupled to the first upper frame member, a second forearm support coupled to the second upper frame member, a first handle joined with the first upper frame member, and a second handle joined with the second upper frame member, the first upper frame member coupled to the first rear lower frame member, the second upper frame member being adjustably coupled to the second rear lower frame member; a back rest coupled to the rear lower frame structure and extending between the first and second rear lower frame members; and a seat operably coupled to and pivotal relative to the rear lower frame structure so as to be pivotally positioned in a seated position or a stowed position.

In certain instances, the first upper frame member may be adjustable relative to the first rear lower frame member, and the second upper frame member may be adjustable relative to the second rear lower frame member so as to increase or decrease a distance between the upper frame structure and the seat.

In certain instances, the wrap around walking aid may further include a seat rest coupled between the first and second front lower frame members, the seat rest supporting the seat when the seat may be in the seated position.

In certain instances, the upper frame structure further includes first and second brakes, the first brake joined with the first upper frame member near the first handle, the second brake joined with the second upper frame member near the second handle.

In certain instances, the first and second front wheels may be fixed wheels, and the first and second rear wheels may be castor wheels.

In certain instances, the wrap around walking aid may further include first and second folding joints, the first folding joint joining the first front lower frame member and the first rear lower frame member, the second folding joint joining the second front lower frame member and the second rear lower frame member.

In certain instances, the wrap around walking aid may further include first and second collapsible struts, the first collapsible strut coupling the first front lower frame member and the first rear lower frame member, the second collapsible strut coupling the second front lower frame member and the second rear lower frame member.

Aspects of the present disclosure may involve a wrap-around walking aid that assists a user in walking in an upright position. The wrap around walking aid may include: a rear lower frame structure including first and second rear lower frame members; a front lower frame structure including a first front lower frame member, a second front lower frame member, and a seat rest coupled to and extending between the first and second front lower frame members, the first front lower frame member coupled to the first rear lower frame member at a first folding joint, the second front lower frame member coupled to the second rear lower frame member at a second folding joint; a first front wheel coupled to the first front lower frame member; a second front wheel coupled to the second front lower frame member; a first rear wheel coupled to the first rear lower frame member; a second rear wheel coupled to the second rear lower frame member; and an upper frame structure including a first upper frame member, a second upper frame member, a first forearm support coupled to the first upper frame member, a second forearm support coupled to the second upper frame member, a first handle joined with the first upper frame member, and a second handle joined with the second upper frame member, the first upper frame member coupled to the first rear lower frame member, the second upper frame member being adjustably coupled to the second rear lower frame member, wherein the rear lower frame structure and the front lower frame structure may be foldable relative to each other about the first and second folding joints such that the first and second front wheels may be positioned closer to the first and second rear wheels in a folded state than when the rear lower frame structure and the front lower frame structure may be in an unfolded state.

In certain instances, the wrap around walking aid may further include a back rest coupled to the rear lower frame structure and extending between the first and second rear lower frame members.

In certain instances, the wrap around walking aid may further include a seat operably coupled to and pivotal relative to the rear lower frame structure so as to be pivotally positioned in a seated position or a stowed position, the seat rest supporting the seat when the seat may be in the seated position.

In certain instances, the wrap around walking aid may further include first and second collapsible struts, the first collapsible strut coupling the first front lower frame member and the first rear lower frame member, the second collapsible strut coupling the second front lower frame member and the second rear lower frame member.

In certain instances, the first upper frame member may be adjustable relative to the first rear lower frame member, and the second upper frame member may be adjustable relative to the second rear lower frame member so as to increase or decrease a distance between the upper frame structure and the seat.

In certain instances, the first and second front wheels may be fixed wheels, and the first and second rear wheels may be castor wheels.

Aspects of the present disclosure may involve a wraparound walking aid that assists a user in walking in an upright position. The wrap around walking aid may include: a rear lower frame structure including first and second rear lower frame members; a front lower frame structure including first and second front lower frame members, the first front lower frame member coupled to the first rear lower frame member, the second front lower frame member coupled to the second rear lower frame member; a first front wheel coupled to the first front lower frame member; a second front wheel coupled to the second front lower frame member; a first rear wheel coupled to the first rear lower frame member; a second rear wheel coupled to the second rear lower frame member; an upper frame structure including a first upper frame member, a second upper frame member, a first forearm support coupled to the first upper frame member, a second forearm support coupled to the second upper frame member, a first handle joined with the first upper frame member, and a second handle joined with the second upper frame member, the first upper frame member being adjustably coupled to the first rear lower frame member along a first length of the first upper frame member, the second upper frame member being adjustably coupled to the second rear lower frame member along a second length of the second upper frame member, the first upper frame member being rotatable relative to the first rear lower frame member so as to be positionable in a first plurality of orientations relative to the first rear lower frame member, the second upper frame member being rotatable relative to the second rear lower frame member so as to be positionable in a second plurality of orientations relative to the second rear lower frame member; and a back rest coupled to the rear lower frame structure and extending between the first and second rear lower frame members.

In certain instances, the first plurality of orientations includes a first forward orientation where the back rest is configured to be positioned behind the legs of the user, and a first reverse orientation where the back rest is configured to be positioned in front of the legs of the user, where the first upper frame member is oriented generally one hundred eighty degrees between the first forward orientation and the first reverse orientation.

In certain instances, the second plurality of orientations includes a second forward orientation where the back rest is configured to be positioned behind the legs of the user, and a second reverse orientation where the back rest is configured to be positioned in front of the legs of the user, where the second upper frame member is oriented generally one hundred eighty degrees between the second forward orientation and the second reverse orientation.

BRIEF DESCRIPTION OF THE FIGURES

The detailed description of some embodiments of the invention is made below with reference to the accompanying figures, wherein like numerals represent corresponding parts of the figures.

FIG. 8 is a side view of the walking aid of FIG. 6, where an opposite side view is the same or substantially similar.

FIGS. 14A and 14B are front and rear close-up isometric views, respectively, of a front wheel of the walking aid including the roll speed control assembly.

FIG. 15A is a side view of a first pivot mechanism coupled with a first upper arm assembly, which is shown semi-transparent.

FIG. 15B is a pair of exploded side views of the first pivot mechanism with the first upper arm assembly shown semi-transparent.

FIG. 15C is an isometric close-up view of the first pivot assembly with the upper end of the first rear lower frame member shown semi-transparent, and with the pin received within the tubular pin receptacle.

FIG. 15D is an isometric close-up view of the first pivot assembly disengaged with a tubular pin receptacle coupled to the upper end of the first rear lower frame member.

DETAILED DESCRIPTION OF CERTAIN EMBODIMENTS

Figure 1:
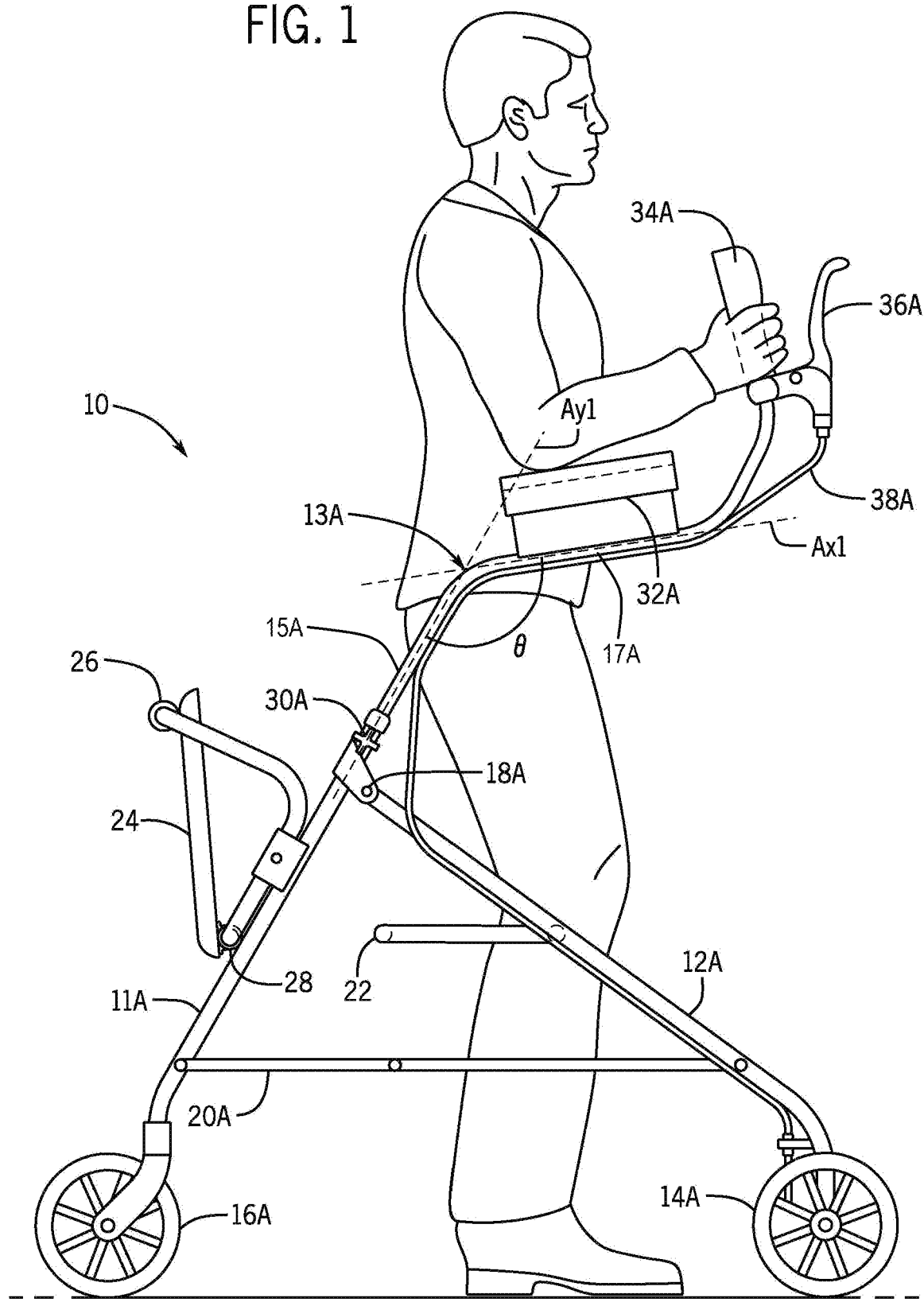
FIG. 1 is a side elevation view of an embodiment of the invention in use.
Figure 2:
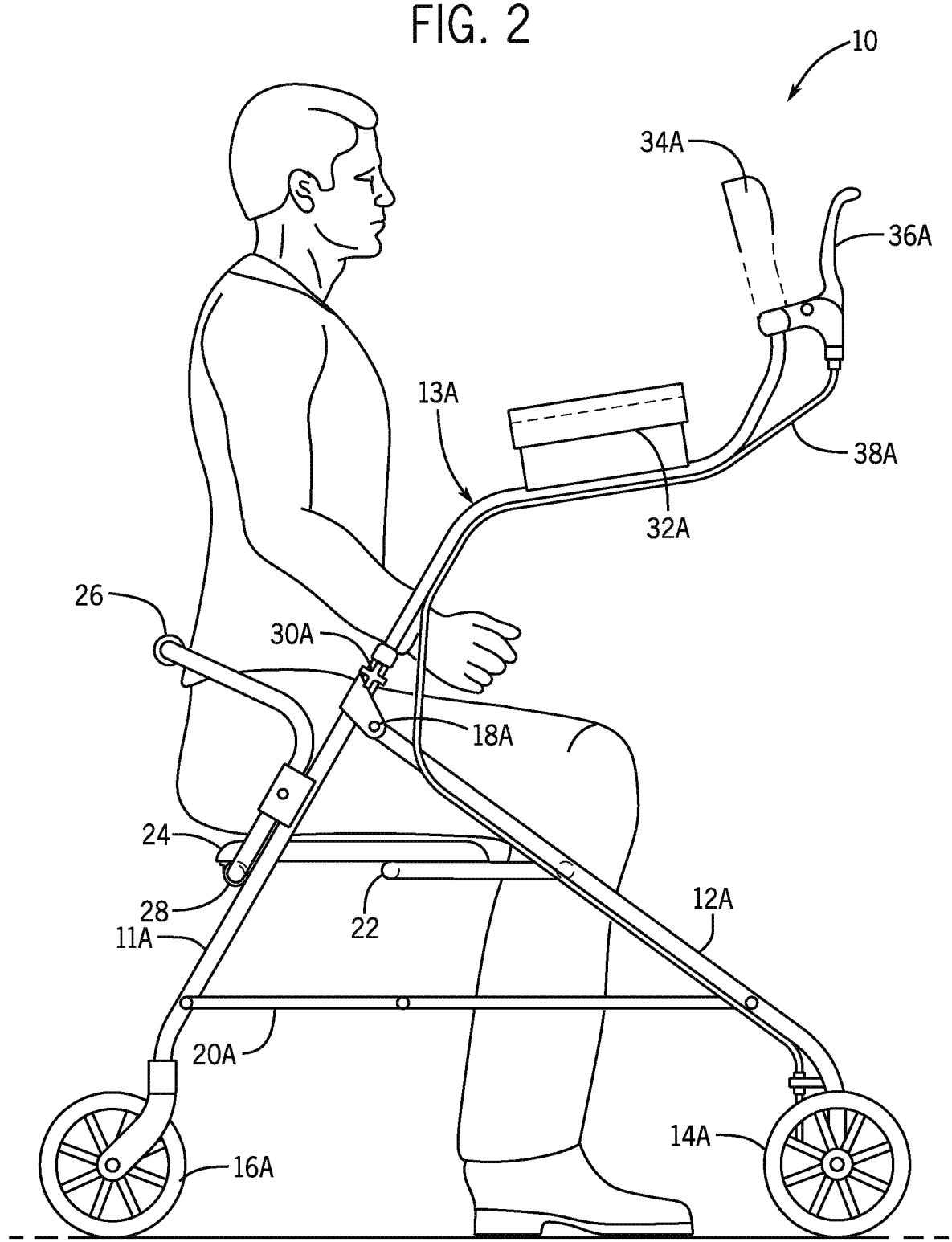
FIG. 2 is a side elevation view showing an embodiment of the invention used in a seating mode.
Figure 5:
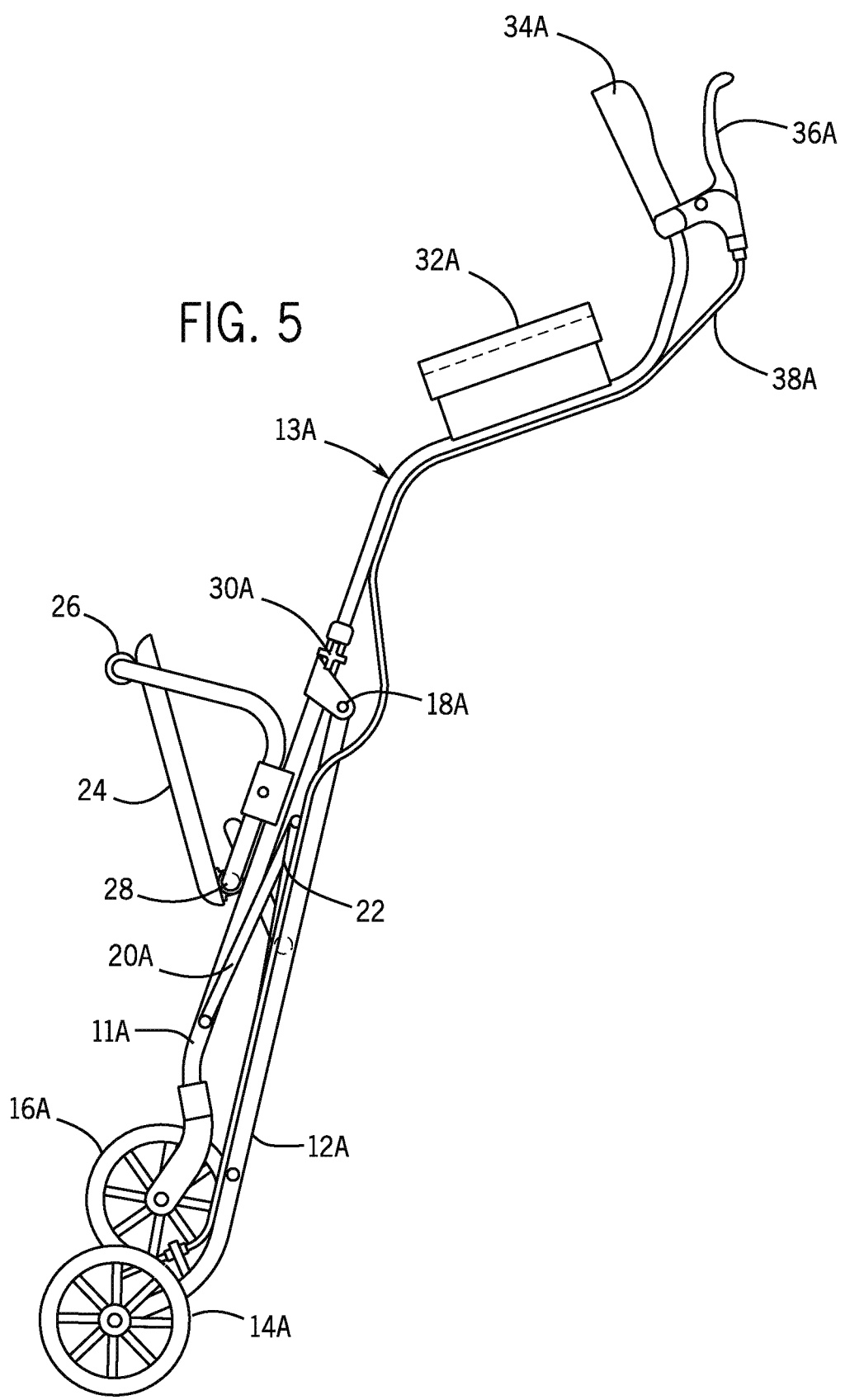
FIG. 5 is a side elevation view showing an embodiment of the invention in a storage mode.

By way of example, and referring to FIG. 1, one embodiment of wrap-around walking aid 10 further comprises first rear lower frame 11A and first front lower frame 12A mechanically coupled to first upper frame 13A. First front lower frame 12A is further mechanically coupled to at least one first fixed front wheel 14A. First rear lower frame 11A is further mechanically coupled to at least one first castor rear wheel 16A. First front lower frame 12A is joined to first rear lower frame 11A at first folding point 18A which is configured to permit first front lower frame 12A to fold upon first rear lower frame 11A as shown in FIG. 5. First rear lower frame 11A is further connected to first front lower frame 12A with at least one first strut 20A. The at least one first strut 20A limits the distance the first front lower frame 12A can move away from first rear lower frame 11A.

First front lower frame 12A is mechanically coupled to seat rest 22 which partially extends between first front lower frame 12A and first rear lower frame 11A. Seat 24 and back rest 26 are attached to seat pivot 28. Back rest 26 is connected to first rear lower frame 11A.

First upper frame 13A has three segments, a first telescoping segment 15A that extends from first rear lower frame 11A and can be tightened into place by first height adjustment 30A. In some embodiments, this could be a quick release height adjustment. The first telescoping segment 15A bends into the first forearm support segment 17A. The first forearm support segment 17A extends on a first forearm axis Ax1 whereas the first telescoping segment 15A is on a first telescoping axis Ay1. Measured from the first telescoping segment 15A the first forearm segment 17A is arranged at a first obtuse angle θ1 that is greater than 90 degrees. First obtuse angle θ1 brings the torso of a human user back slightly to create a more upright posture reducing neck and back pain.

The first forearm support segment is mechanically coupled to first forearm rest 32A. The first forearm support segment bends into a first handle segment. The first handle segment is mechanically coupled to first handle 34A. First handle 34A is further mechanically coupled to first hand brake 36A. First hand brake 36A can be squeezed toward first handle 34A to engage first brake cable 38A. First brake cable 38A is mechanically coupled to at least one first fixed front wheel 14A.

Figure 3:
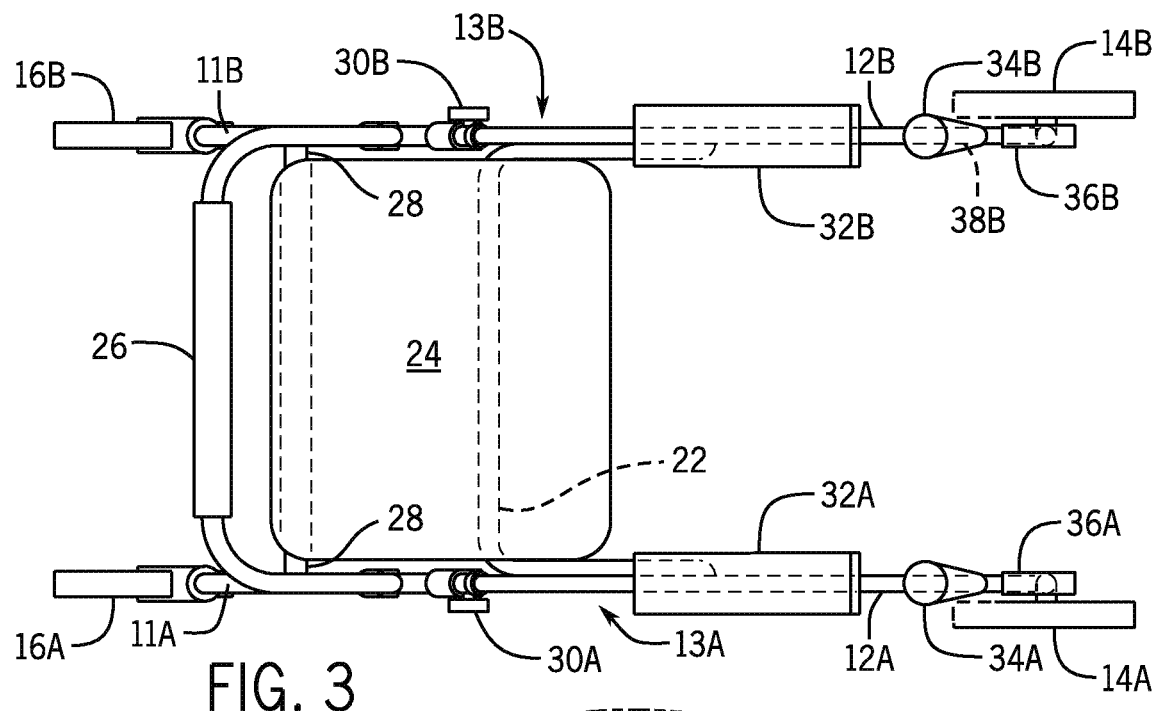
FIG. 3 is a top plan view of an embodiment of the invention.

FIG. 3 illustrates that some parts can exist in multiple quantities. For instance, one embodiment of wrap-around walking aid 10 further comprises second rear lower frame 11B and second front lower frame 12B mechanically coupled to second upper frame 13B. Second front lower frame 12B is further mechanically coupled to at least one second fixed front wheel 14B. Second rear lower frame 11B is further mechanically coupled to at least one second castor rear wheel 16B. Second front lower frame 12B is joined to second rear lower frame 11B at second folding point 18B which is configured to permit second front lower frame 12B to fold upon second rear lower frame 11B as shown in FIG. 5. Second rear lower frame 11B is further connected to second front lower frame 12B with at least one second strut 20B. The at least one second struts 20B limits the distance the second front lower frame 12B can move away from second rear lower frame 11B.

Figure 4:
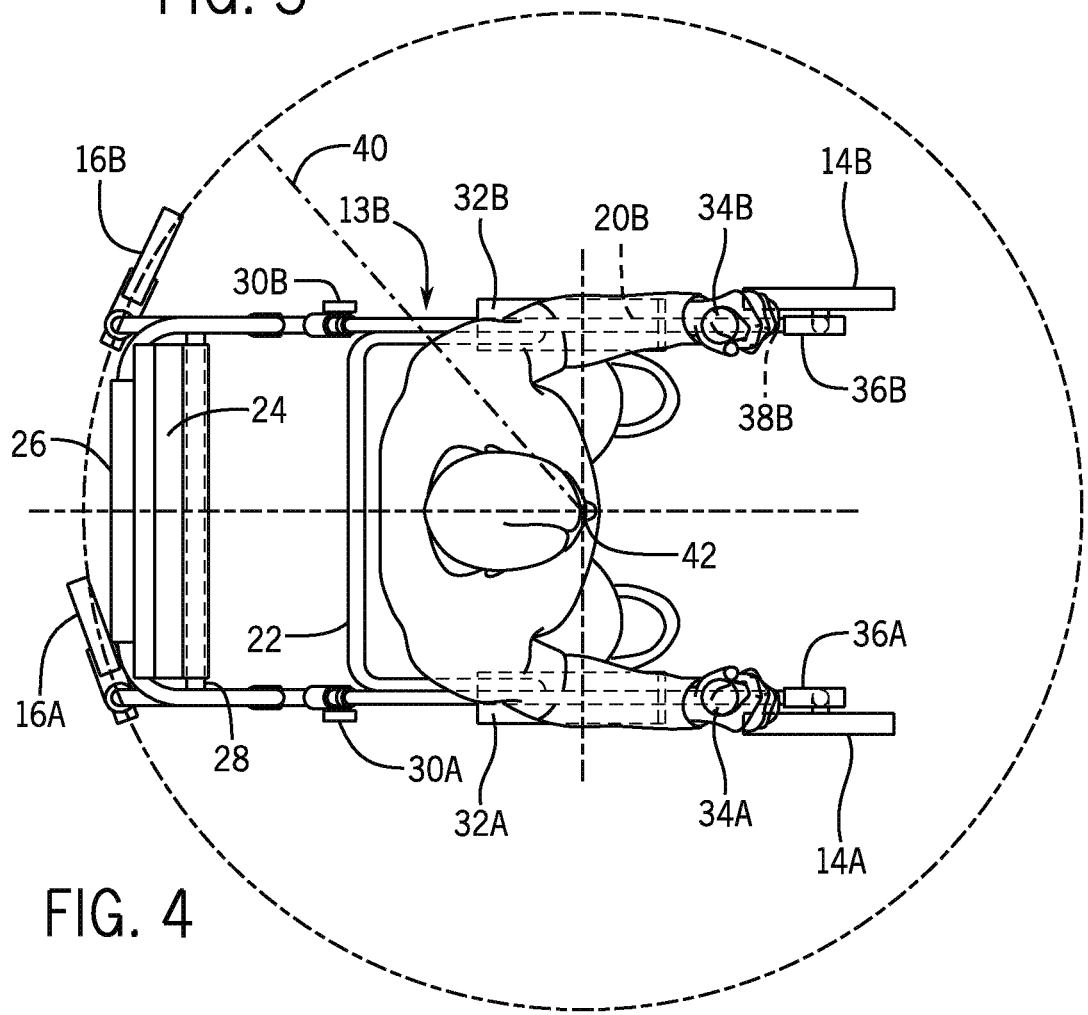
FIG. 4 is a top plan view of an embodiment of the invention with a user.

Second front lower frame 12B is mechanically coupled to seat rest 22 which partially extends between second front lower frame 12B and second rear lower frame 11B. Seat 24 and back rest 26 are attached to seat pivot 28. Back rest 26 is connected to second rear lower frame 11B. Note that contrary to conventional walkers, as shown in FIG. 3 and FIG. 4, there is no support member forward of seat 24 when deployed. This removes a common problem in conventional walkers—the human user banging legs and knees on forward supports.

Second upper frame 13B has three segments, a second telescoping segment 15B that extends from second rear lower frame 11B and can be tightened into place by second height adjustment 30B. In some embodiments, this could be a quick release height adjustment. The second telescoping segment 15B bends into the second forearm support segment 17B. The second forearm support segment 17B extends on a second forearm axis whereas the second telescoping segment 15B is on a second telescoping axis. Measured from the second telescoping segment the second forearm segment is arranged at a second obtuse angle that is greater than 90 degrees. The second obtuse angle brings the torso of a human user back slightly to create a more upright posture reducing neck and back pain.

The second forearm support segment is mechanically coupled to second forearm rest 32B. The second forearm support segment bends into a second handle segment. The second handle segment is mechanically coupled to second handle 34B. Second handle 34B is further mechanically coupled to second hand brake 36B. Second hand brake 36B can be squeezed toward second handle 34B to engage second brake cable 38B. Second brake cable 38B is mechanically coupled to at least one second fixed front wheel 14B.

Further, as shown in FIG. 4, wrap-around walking aid 10 can be scaled to accommodate any size human user. The human user's nose is approximately in the position of center of rotation 42 of at least one first castor rear wheel 16A and at least one second castor rear wheel 16B creating turn radius 40. This enables a user to easily turn wrap-around walking aid 10 while moving forward. Turn radius 40 is very tight, in some cases as wide as wrap-around walking aid 10.

Figure 11:
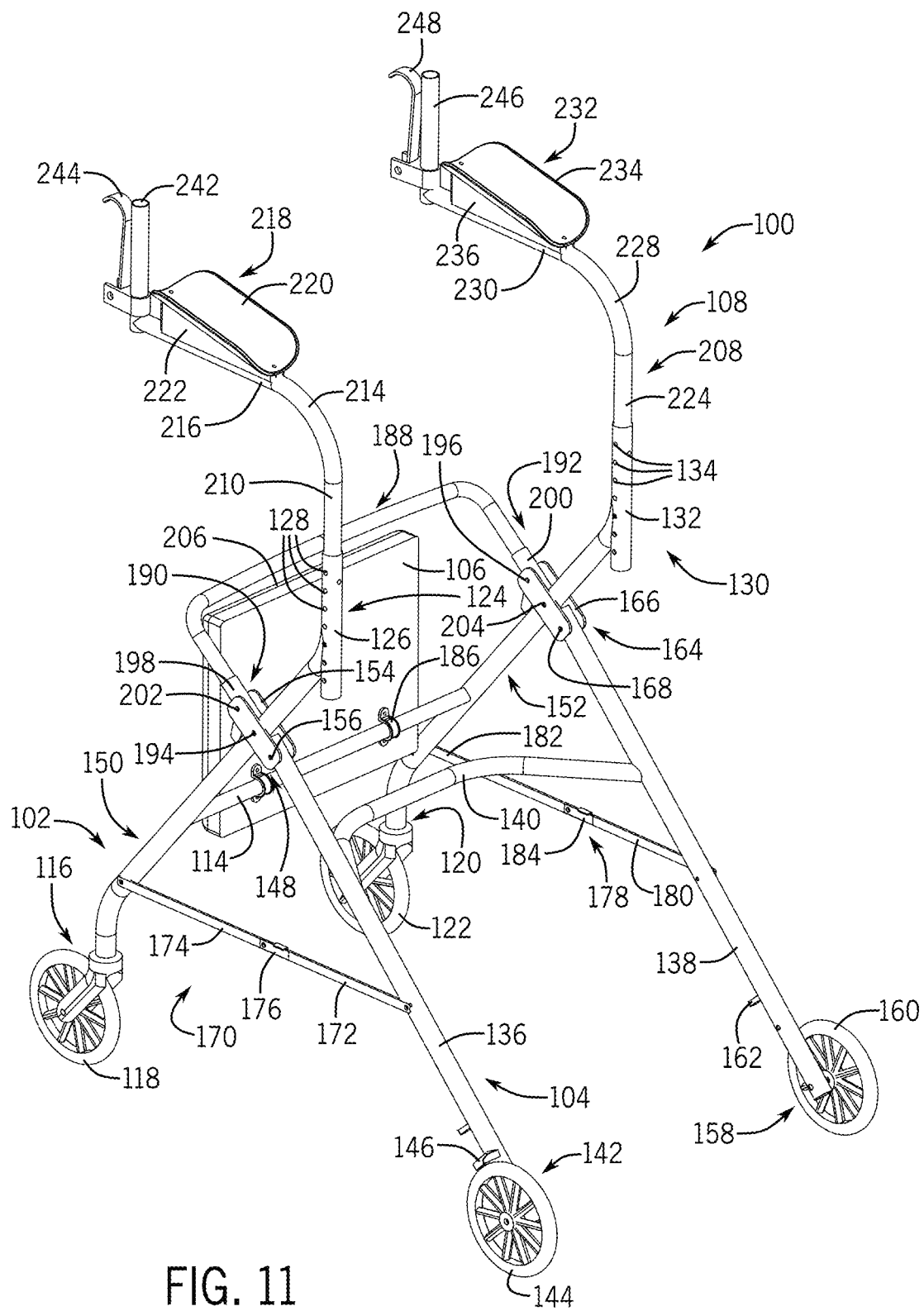
FIG. 11 is a front isometric view of the walking aid of FIG. 6 with the seat pivoted upwards and the upper frame structure rotated one hundred eighty degrees from a forward orientation to a rearward orientation.

Reference is made to FIGS. 6-10, which depict another embodiment of a walking aid 100. In particular, FIGS. 6-10 depict, respectively, an isometric front view of the walking aid 100, a front isometric-exploded view of the walking aid 100, a first side view of the walking aid 100, a top view of the walking aid 100, and a bottom view of the walking aid 100. The walking aid 100 may be used in the same manner as the previous described walking aid and may include the same or different components. The walking aid 100 may be considered a wraparound walking aid because the structure of the walking aid 100 wraps around the back of the user when the upper frame structure is oriented in a forward facing position. The walking aid 100 may also wrap around the front of the user when the upper frame structure is oriented in a rearward, or opposite facing, position. In the forward facing position, as shown FIGS. 1 and 6, among others, the area in front of the user's body is open or clear from obstruction by the structure of the walking aid 100. Conversely, in the rearward, or opposite facing, position, as seen in FIG. 11, the area behind the user's body is open or clear from obstruction by the structure of the walking aid 100. In the forward facing position, the user may walk and then sit without turning their body relative to the walking aid 100. In the rearward facing position, the user may walk and then turn one hundred eighty degrees before sitting on the seat of the walking aid 100.

Figure 6:
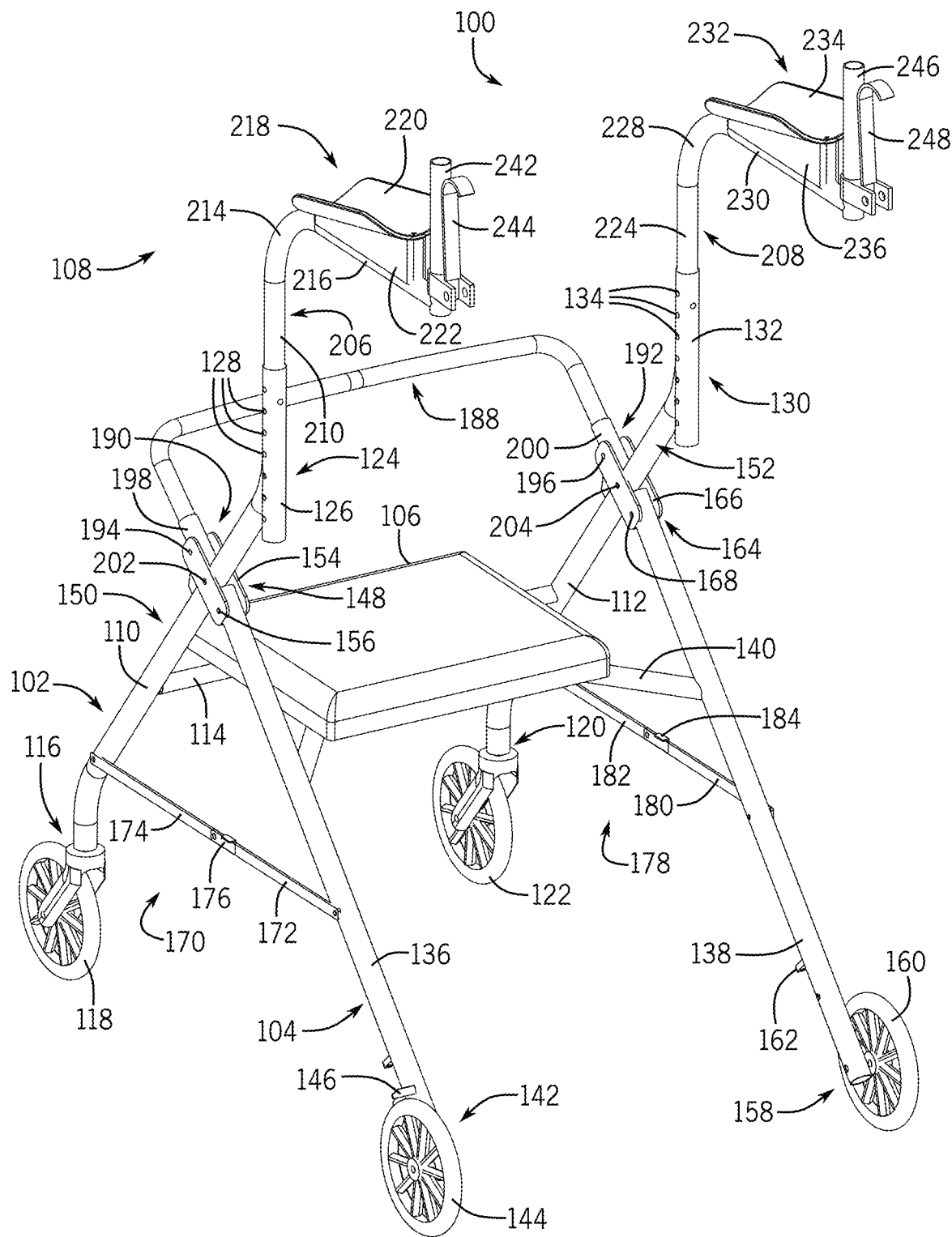
FIG. 6 is a front isometric view of a walking aid.
Figure 7:
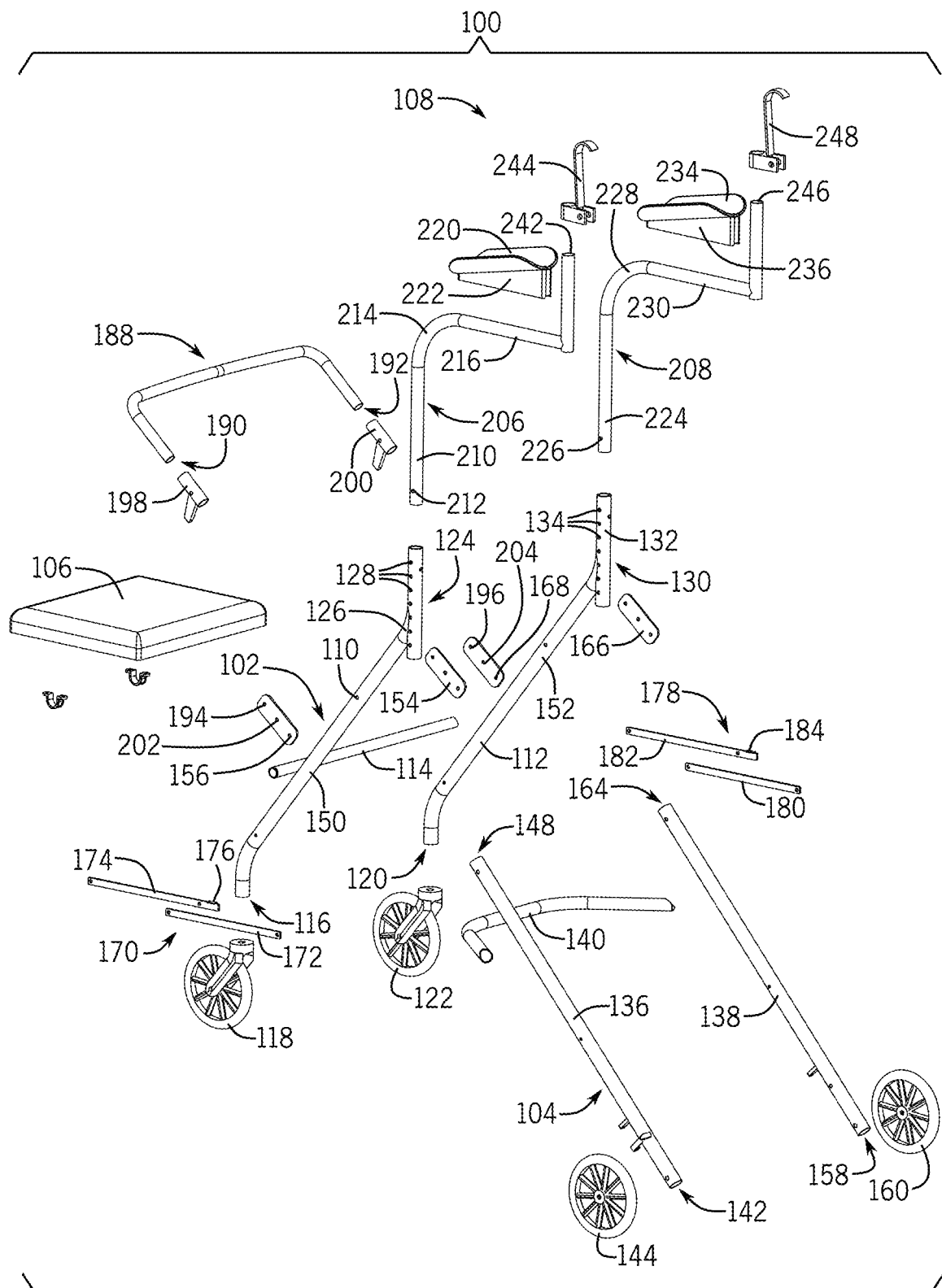
FIG. 7 is a front exploded-isometric view of the walking aid of FIG. 6.
Figure 8:
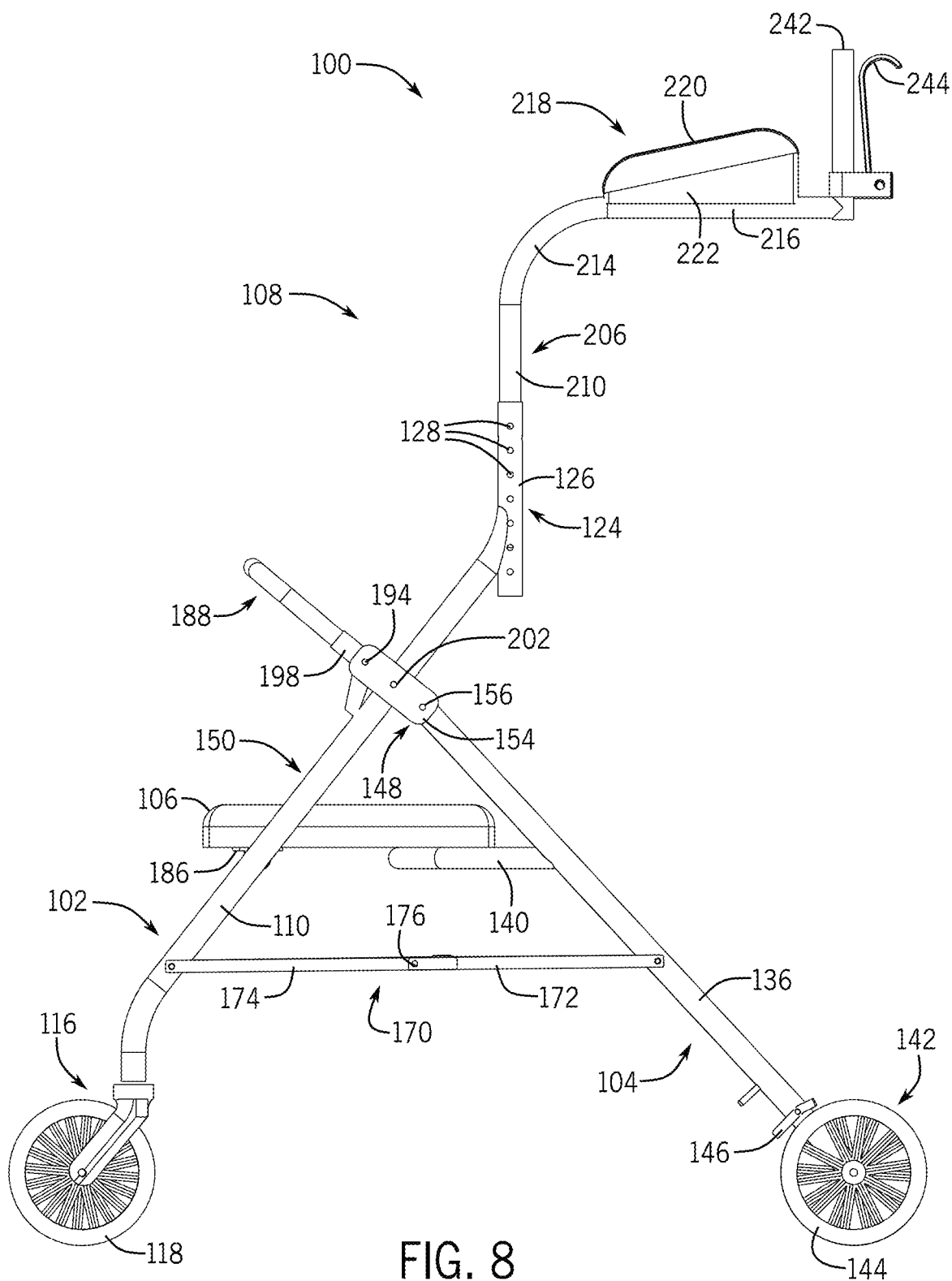
Figure 9:
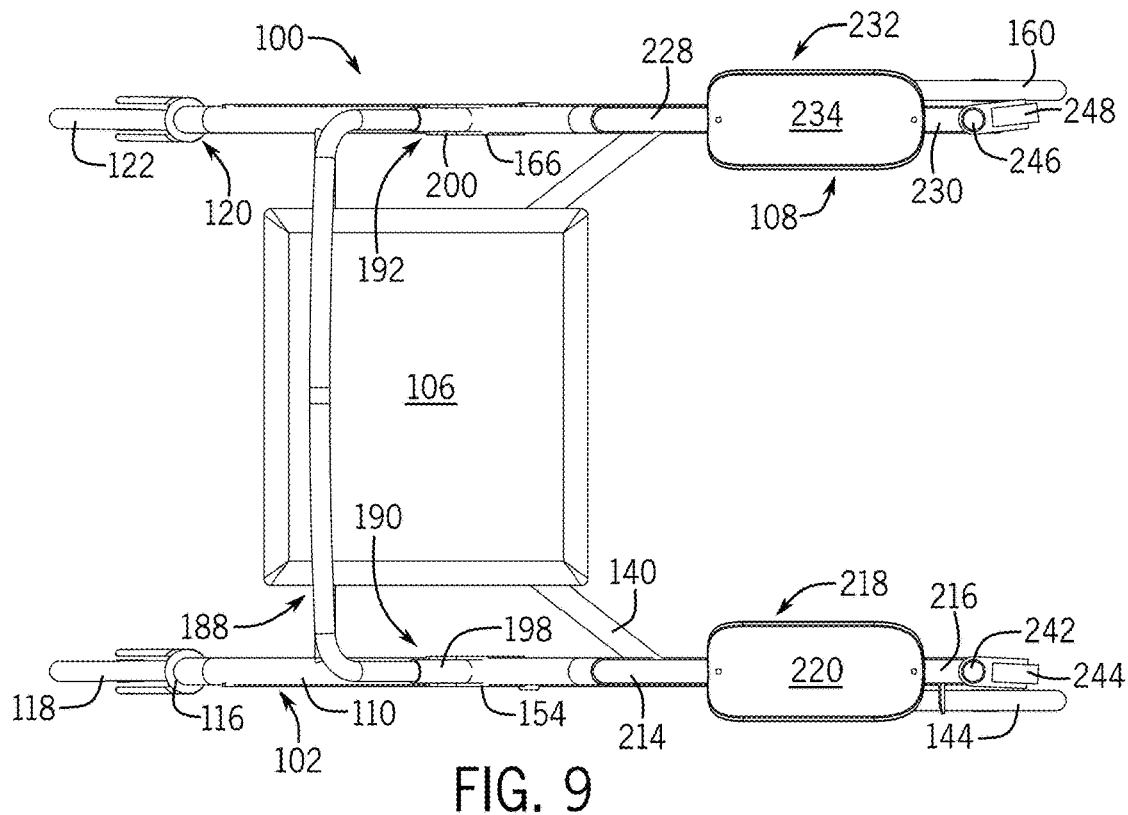
FIG. 9 is a top view of the walking aid of FIG. 6.
Figure 10:
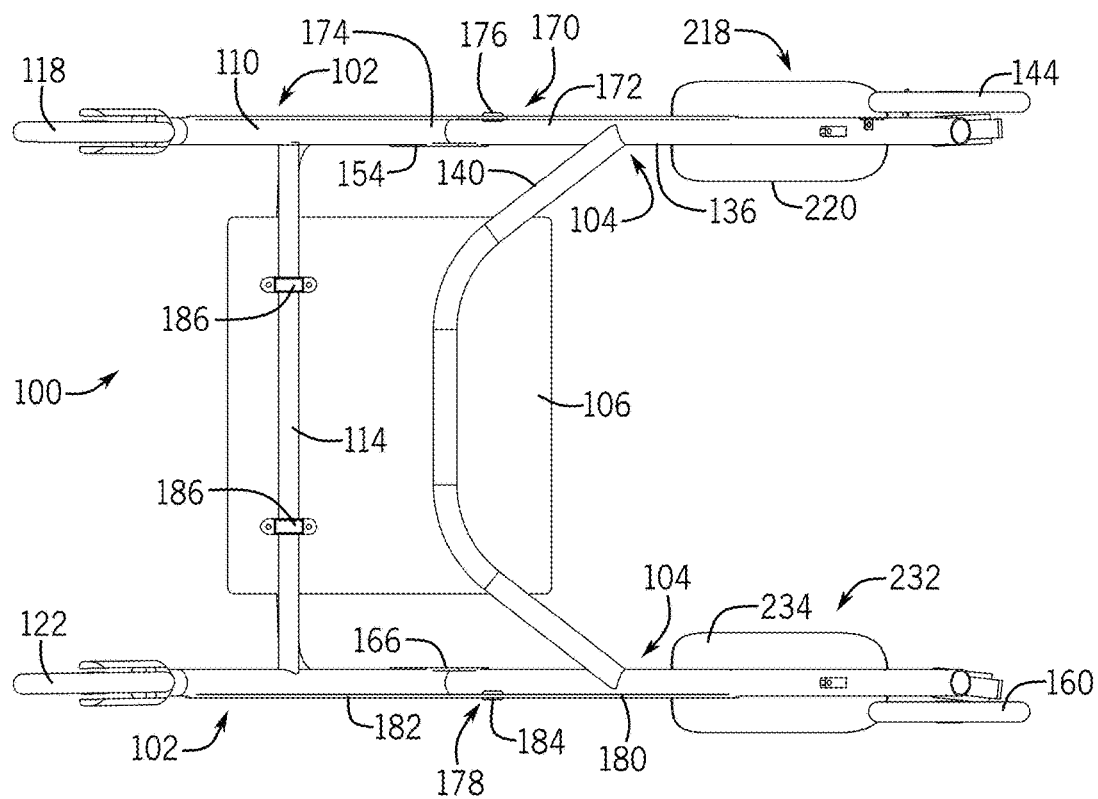
FIG. 10 is a bottom view of the walking aid of FIG. 6.

As seen in FIG. 6, which shows the walking aid 100 with the seat in a lowered, down, or seated position, the walking aid 100 includes a rear lower frame structure 102, a front lower frame structure 104, a seat 106, and an upper frame structure 108. The rear lower frame structure 102 may include a first rear lower frame member 110, a second rear lower frame member 112, and a rear seat support member 114 coupled between the first and second lower frame members 110, 112. A lower end 116 of the first rear lower frame member 110 is rotatably coupled with a first rear wheel 118, which may be a wheel that freely rotates (e.g., cator wheel), as previously described herein. A lower end 120 of the second rear lower frame member 112 is rotatably coupled with a second rear wheel 122, which may be a wheel that freely rotates (e.g., castor wheel), as previously described herein. An upper end 124 of the first rear lower frame member 110 includes a first tubular member 126 including vertically spaced through-holes 128 therein. The first tubular member 126 is vertically oriented with respect to the floor surface the walking aid 100 is used on, and includes a longitudinal axis extending through a lumen of the member 126, where the longitudinal axis is generally perpendicular to the floor surface. A first linear section 150 of the first rear lower frame member 110 connects the lower end 116 and the upper end 124. An upper end 130 of the second rear lower frame member 112 includes a second tubular member 132 including vertically spaced through-holes 134 therein. The second tubular member 132 is vertically oriented with respect to the floor surface the walking aid 100 is used on, and includes a longitudinal axis extending through a lumen of the member 132, where the longitudinal axis is generally perpendicular to the floor surface. A second linear section 152 of the second rear lower frame member 112 connects the lower end 120 and the upper end 130.

The front lower frame structure 104 includes a first front lower frame member 136, a second front lower frame member 138, and a front seat support member 140 that is curved and that couples between the first and second front lower frame members 136, 138. When the seat 106 of the walking aid 100 is in the lowered position, a bottom surface of the seat 106 contacts the front seat support member 140 and prevents the seat 106 from rotating further. In this orientation (i.e., seat in lowered position), the seat 106 is generally level or parallel with the floor surface.

A lower end 142 of the first front lower frame member 136 is coupled with a first front wheel 144 that may be locked or fixed in a particular orientation. That is, the first front wheel 144 may rotate such that the walking aid 100 may be utilized to move forward, back, etc., but the first front wheel 144 may be fixed so as to not be rotatable about an axis perpendicular to the wheel's axis of rotation. A lock 146 may be positioned at the lower end 142 near the first front wheel 144 so as to lock the rotation of the first front wheel 144. An upper end 148 of the first front lower frame member 136 is pivotally coupled with a front section of a pair of first frame connection plates 154 at a joint 156, which may be a pin, rivet, or the like.

A lower end 158 of the second front lower frame member 138 is coupled with a second front wheel 160 that may be locked or fixed in a particular orientation. That is, the second front wheel 160 may rotate such that the walking aid 100 may be utilized to move forward, back, etc., but the second front wheel 160 may be fixed so as to not be rotatable about an axis perpendicular to the wheel's axis of rotation. A lock 162 may be positioned at the lower end 158 near the second front wheel 160 so as to lock the rotation of the second front wheel 160. An upper end 164 of the second front lower frame member 138 is pivotally coupled with a front section of a pair of second frame connection plates 166 at a joint 168, which may be a pin, rivet, or the like.

A first folding strut 170 connects the first rear lower frame member 110 and the first front lower frame member 136. The first folding strut 170 includes a front strut 172 coupled with a rear strut 174 about a joint 176. A second folding strut 178 connects the second rear lower frame member 112 and the second front lower frame member 138. The second folding strut 178 includes a front strut 180 coupled with a rear strut 182 about a joint 184. In this way, when the walking aid 100 is pivoted or folded about the joints 156, 168 of the first and second frame connection plates 154, 166, the first and second folding struts 170, 178 may be permitted to collapse or pivot about the joints 176, 184 such that the rear lower frame structure 102 and the front lower frame structure move closer together or converge. Each of the first and second folding struts 170, 178 may include a stop feature such that the struts 170, 178 can only pivot in one direction and are restrained from pivoting in an opposite direction (i.e., beyond ninety degrees).

The seat 106 is pivotally coupled with the rear seat support member 114 so as to pivot between a seated, down, or lowered position (shown in FIG. 6) and a stowed, up, or raised position (shown in FIG. 11). A top surface of the seat 106 may be padded and a bottom surface of the seat 106 may be stiff or hard. A pair of rod clamps 186, seen in FIG. 11, may be positioned on the bottom surface of the seat 106 to receive the rear seat support member 114 therethrough. In this way, the seat 106 may pivot about the rear seat support member 114 from the lowered position to the raised position.

In the raised position, as seen in FIG. 11, the seat 106 may contact and be restrained from further pivoting by a back support member 188 that is U-shaped. The back support member 188 includes a first end 190 and a second end 192, where the first end is pivotally coupled with a rear section of the first frame connection plate 154 at a joint 194, such as a pin, rivet, or the like. The second end 192 of the back support member 188 is pivotally coupled with a rear section of the second frame connection plate 166 at a joint 196, such as a pin, rivet, or the like. More particularly, the first end 190 of the back support member 188 may fit within a sleeve 198 having a stop member that contacts the linear section 150 and restricts the back support member 188 from rotating back towards the rear seat support member 114. Similarly, the second end 192 of the back support member may fit within a sleeve 200 having a stop member that contacts the linear section 152 and restricts the back support member 188 from rotating back towards the rear seat support member 114.

Turning back to the rear lower frame structure 102, the linear section 150 of the first rear lower frame member 110 extends through the pair of first frame connection plates 154 between the first end 190 of the back support member 188 and the upper end 124 of the first rear lower frame member 110. The linear section 150 may be pivotally coupled with the pair of first frame connection plates 154 at a joint 202, such as a pin, rivet, or the like. On the other side, the linear section 152 of the second rear lower frame member 112 extends through the pair of second frame connection plates 166 between the second end 192 of the back support member 188 and the upper end 130 of the second rear lower frame member 112. The linear section 152 may be pivotally coupled with the pair of second frame connection plates 166 at a joint 204, such as a pin, rivet, or the like.

The upper frame structure 108 includes a first upper frame member 206, and a second upper frame member 208. The first upper frame member 206 may be L-shaped and includes a lower cylindrical section 210 that is linear with through-holes 212 vertically spaced along the section 210. The first upper frame member 206 also includes a curved transition section 214 and a first forearm section 216 that is linear and generally perpendicular to the lower cylindrical section 210. A first forearm support 218 is coupled to the first forearm section 216. The first forearm support 218 includes a curved support pad 220 for contacting and supporting the user's forearm, and a flared support member 222 positioned between the curved support pad 220 and the first forearm section 216. The flared support member 222 angles the curved support pad 220 so the front end of the pad 220 is farther away from the first forearm section 216 than a rear end of the pad 220. The angle of the curved support pad 220 may vary depending on the height of the user of the walking aid 100. With the first forearm section 216 being generally level or parallel with the floor surface, the curved support pad 220 will cause a user's arm to angle slightly upward from the elbow to the hand.

The first forearm section 216 is coupled with a first handle 242 oriented generally perpendicular to the first forearm section 216. Coupled to the first handle 242 is a brake lever 244 that is linked with a brake at the first front wheel 144.

The second upper frame member 208 may also be L-shaped and includes a lower cylindrical section 224 that is linear with through-holes 226 vertically spaced along the section 224. The second upper frame member 208 also includes a curved transition section 228 and a second forearm section 230 that is linear and generally perpendicular to the lower cylindrical section 224. A second forearm support 232 is coupled to the second forearm section 230. The second forearm support 232 includes a curved support pad 234 for contacting and supporting the user's forearm, and a flared support member 236 positioned between the curved support pad 234 and the second forearm section 230. The flared support member 236 angles the curved support pad 234 so the front end of the pad 234 is farther away from the second forearm section 230 than a rear end of the pad 234. The angle of the curved support pad 234 may vary depending on the height of the user of the walking aid 100. With the first forearm section 230 being generally level or parallel with the floor surface, the curved support pad 234 will cause a user's arm to angle slightly upward from the elbow to the hand.

The second forearm section 230 is coupled with a second handle 246 oriented generally perpendicular to the second forearm section 230. Coupled to the second handle 246 is a brake lever 248 that is linked with a brake at the second front wheel 160.

In order to adjust the height of the upper frame structure 108 relative to the floor surface, the lower cylindrical sections 210, 224 of the first and second upper frame members 206, 208 may be received within the lumens of the first and second tubular member 126, 132, respectively, and first and second pins (not shown) may be inserted into coaxially aligned through-holes 128, 134, 212, 226 of the lower cylindrical sections 210, 224 and the first and second tubular members 126, 132, respectively. That is, the first and second upper frame members 206, 208 of the upper frame structure 108 are adjustably coupled, respectively, to the first and second rear lower frame member 110, 112 of the rear lower frame structure 102 along lengths of the first and second upper frame members 206, 208. More particularly, the first and second upper frame members 206, 208 of the upper frame structure 108 and the first and second tubular member 126, 132 define a telescoping connection between each other. Adjustment of the height of the upper frame structure 108 does not move the relative fore-aft position of first and second forearm supports 218, 232. That is, the height adjustment of the upper frame structure 108 is accomplished in the vertical direction only.

Reference is made to FIG. 11, which depicts the walking aid 100 with the seat 106 in an up or upward position, and the first and second upper frame members 206, 208 of the upper frame structure 108 rotated one hundred eighty degrees from a forward position or orientation to a rearward position or orientation. More particularly, the first upper frame member 206 is rotated one hundred eighty degrees about the longitudinal axis through the lumen of the first tubular member 126, and the second upper frame member 208 is rotated one hundred eighty degrees about the longitudinal axis through the lumen of the second tubular member 132. In this way, the walking aid 100 may be used by a user where the seat 106, the front seat support member 140, and back rest 188 are positioned in front of the user's legs, where the freely rotatable rear wheels 118, 122 are positioned, generally, beneath the first and second handles 242, 246. Alternatively, the walking aid may be used by a user where the seat 106, the front seat support member 140, and back rest 188 are positioned behind the user's legs, where the fixed front wheels 144, 160 are positioned, generally, beneath the first and second handles 242, 246.

Stated differently, the walking aid 100 is configurable in at least two arrangements for supporting a user in walking. In a first arrangement of the walking aid 100, shown in FIG. 6, the seat 106 (in either an upward or down position) is positioned behind the user such that an area between and in front of the first and second upper frame members 206, 208 is open. In a second arrangement of the walking aid 100, shown in FIG. 11, the seat 106 (in either an upward or down position) is positioned in front of the user such that an area between and in front of the first and second upper frame members 206, 208 is blocked or obstructed by the seat 106, the front seat support member 140, the back support member 188, and the rear seat support member 114.

Figure 12:
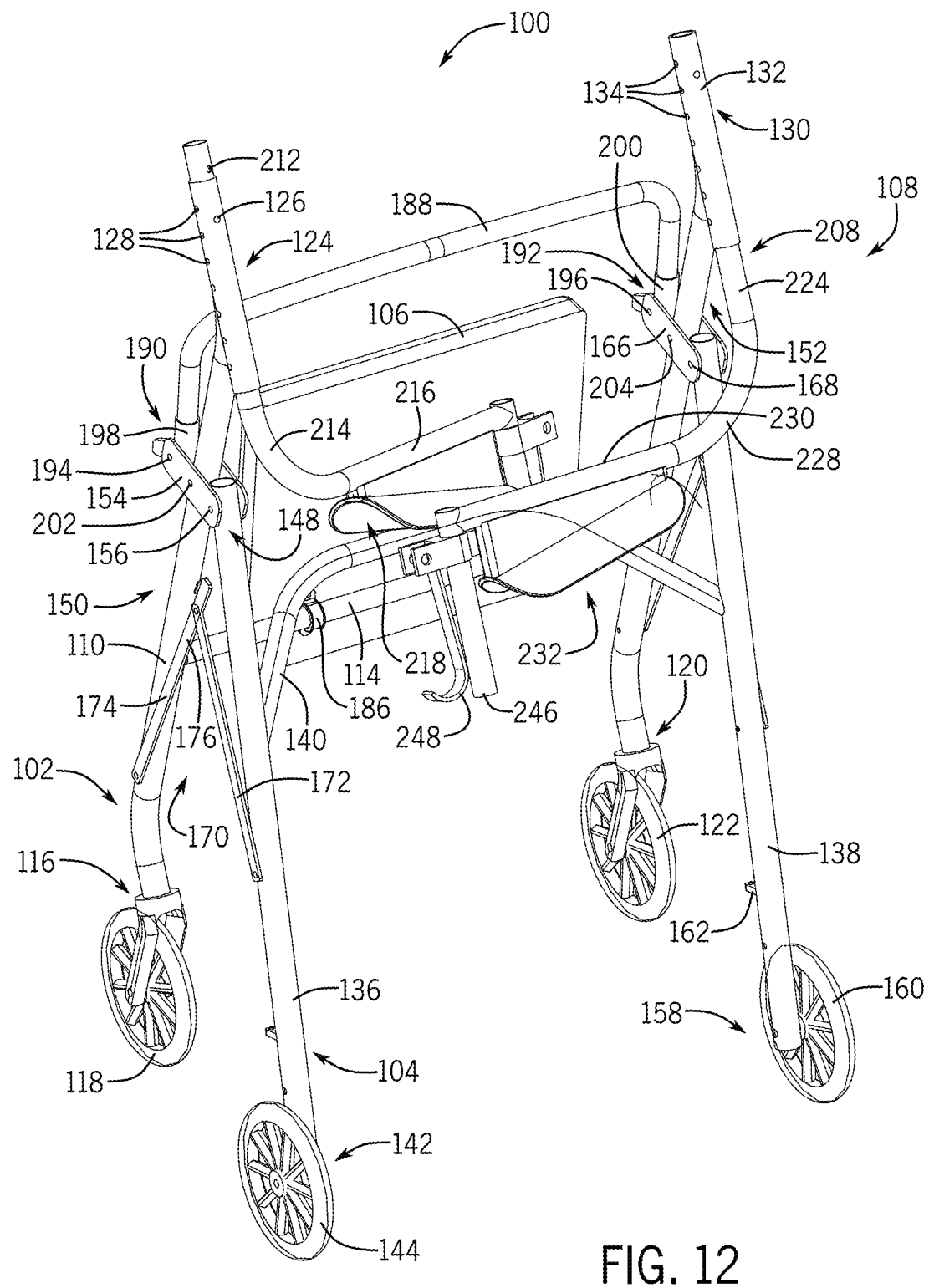
FIG. 12 is a front isometric view of the walking aid of FIG. 6 in a folded or stowed position.

Reference is made to FIG. 12, which is an isometric view of the walking aid 100 in a folded, stowed, or stored position. In particular, the walking aid 100 may be pivoted or folded about the joints 156, 168 of the first and second frame connection plates 154, 166 such that the rear lower frame structure 102 and the front lower frame structure 104 move closer together or converge. To permit this pivoting, the first and second folding struts 170, 178 also collapse or pivot about their respective joints 176, 184. As seen in the figure, the back support member 188 may be pivoted about the joints 194, 196 at the rear of first and second frame connection plates 154, 166. And, the first and second lower cylindrical sections 210, 224 of the first and second upper frame members 206, 208, respectively, may be removed from being received within the top openings of the first and second tubular member 126, 132 of the first and second rear lower frame members 110, 112. The first and second lower cylindrical sections 210, 224 may then be received within bottom openings of the first and second tubular members 126, 132 of the first and second rear lower frame members 110, 112, respectively. The first and second upper frame members 206, 208 may be pivoted about the longitudinal axes of the lumens of the first and second tubular members 126, 132 such that the first and second handles 242, 246 are positioned adjacent each other and inward of the first and second tubular members 126, 132.

In the folded position, seen in FIG. 12, the walking aid 100 may be transported by rolling the walking aid 100 on the front wheels 144, 160 or carried. As seen in FIG. 12, the front wheels 144, 160 are positioned outside of the rear wheels 118, 122 such that the front wheels 144, 160 are still rotatable.

Reference is made to FIGS. 13-16, which depicts another embodiment of a walking aid 300. The walking aid 300 may be used in the same manner as the previous described walking aids and may include the same or different components. The walking aid 300 may be considered a wraparound walking aid because the structure of the walking aid 300 wraps around the back of the user when the upper frame structure is oriented in a forward facing position. The walking aid 300 may also wrap around the front of the user when the upper frame structure is oriented in a rearward, or opposite facing, position. In the forward facing position, as shown FIGS. 1, 6, and 13A, among others, the area in front of the user's body is open or clear from obstruction by the structure of the walking aid 300. Conversely, in the rearward, or opposite facing, position, as shown in FIGS. 13B, the area behind the user's body is open or clear from obstruction by the structure of the walking aid 300. In the forward facing position, the user may walk and then sit without turning their body relative to the walking aid 300. In the rearward facing position, the user may walk and then turn one hundred eighty degrees before sitting on the seat of the walking aid 300. As seen in FIGS. 13B, the seat of the walking aid 300 may be in a raised position to permit additional space for the user to walk in the direction of the seat.

The walking aid 300 of FIGS. 13-16 may include a portion of or all of the structure from the embodiment of the walking aid 100 in FIGS. 6-12. As such a full description of the walking aid 300 will not be included. Instead, only certain features will be described. In particular, the walking aid 300 differs from the previous walking aid only by the roll speed control assemblies 362, 346 and the pivot mechanisms 500, 600. As such, all description of the previously described walking aid is incorporated into the present discussion of the walking aid 300.

Figure 13A:
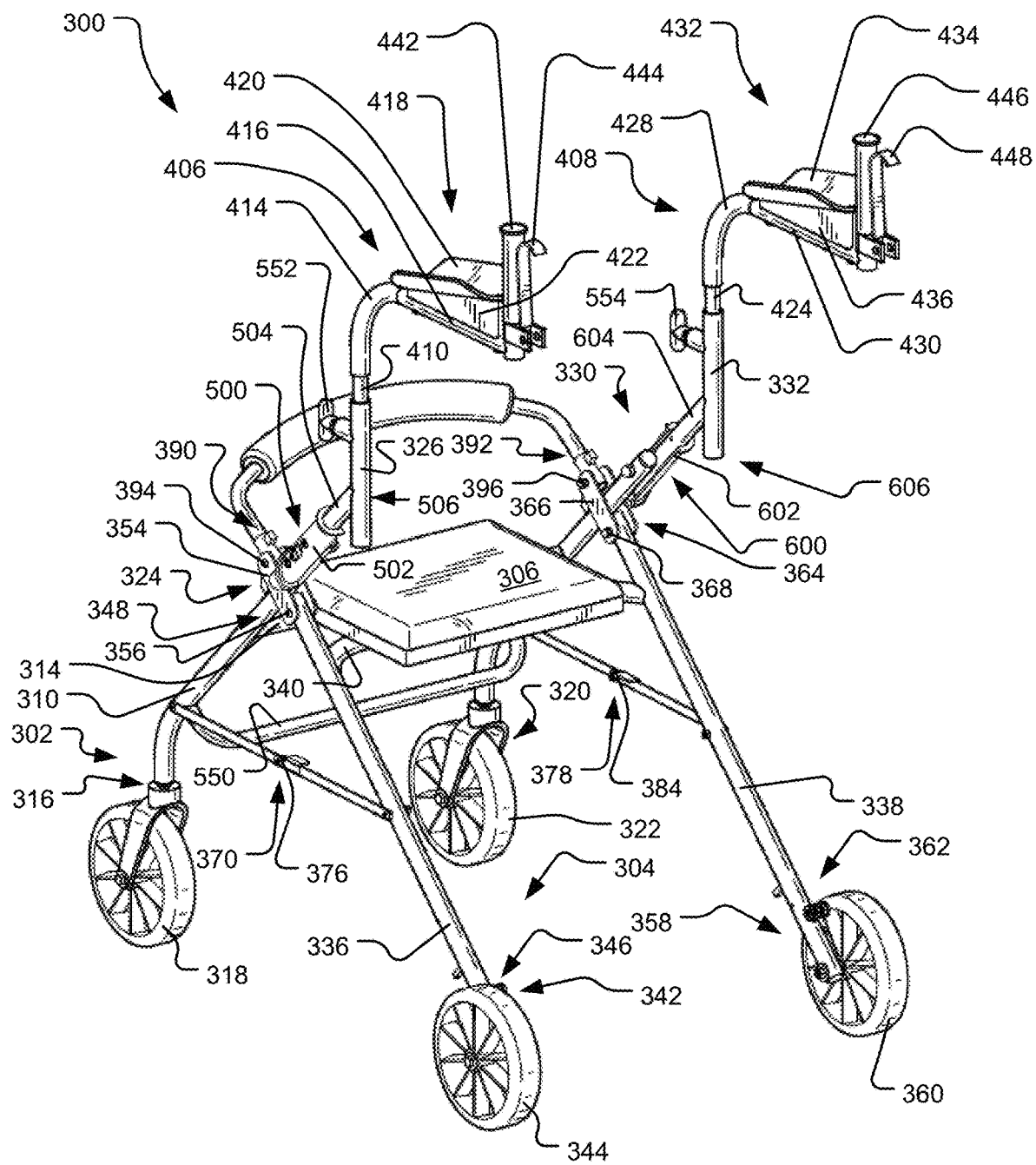
FIGS. 13A and 13B are front isometric views of a walking aid in a first orientation, and a second orientation, respectively.

As seen in FIGS. 13A, among others, which shows the walking aid 300 in a first orientation with the seat in a lowered, down, or seated position and the walking aid 300 generally oriented behind the user, the walking aid 300 includes a rear lower frame structure 302, a front lower frame structure 304, a seat 306, and an upper frame structure 308. The rear lower frame structure 302 may include a first rear lower frame member 310, a second rear lower frame member 312, and a rear seat support member 314 coupled between the first and second lower frame members 310, 312. A lower end 316 of the first rear lower frame member 310 is rotatably coupled with a first rear wheel 318, which may be a wheel that freely rotates (e.g., cator wheel), as previously described herein. A lower end 320 of the second rear lower frame member 312 is rotatably coupled with a second rear wheel 322, which may be a wheel that freely rotates (e.g., castor wheel), as previously described herein. An upper end 324 of the first rear lower frame member 310 is pivotally coupled to a first pivot or hinge mechanism 500 (also called a pivot and latch mechanism). The first pivot mechanism 500 includes a first cuff member 502 that engages a first lower member 504 of a first upper arm assembly 506. The first lower member 504 is coupled with a first upper tubular member 326 of the first upper arm assembly 506. The first upper tubular member 326 is vertically oriented with respect to the floor surface the walking aid 300 is used on, and includes a longitudinal axis extending through a lumen of the member 326, where the longitudinal axis is generally perpendicular to the floor surface.

An upper end 330 of the second rear lower frame member 312 is pivotally coupled to a second pivot or hinge mechanism 600 (also called a pivot and latch mechanism). The second pivot mechanism 600 includes a second cuff member 602 that engages a second lower member 604 of a second upper arm assembly 606. The second lower member 604 is coupled with a second upper tubular member 332. The second tubular member 332 is vertically oriented with respect to the floor surface the walking aid 300 is used on, and includes a longitudinal axis extending through a lumen of the member 332, where the longitudinal axis is generally perpendicular to the floor surface.

The front lower frame structure 304 includes a first front lower frame member 336, a second front lower frame member 338, and a front seat support member 340 that is curved and that couples between the first and second front lower frame members 336, 338. When the seat 306 of the walking aid 300 is in the lowered position, a bottom surface of the seat 306 contacts the front seat support member 340 and prevents the seat 306 from rotating further. In this orientation (i.e., seat in lowered position), the seat 306 is generally level or parallel with the floor surface.

A lower end 342 of the first front lower frame member 336 is coupled with a first front wheel 344 that may be locked or fixed in a particular orientation. That is, the first front wheel 344 may rotate such that the walking aid 300 may be utilized to move forward, back, etc., but the first front wheel 344 may be fixed so as to not be rotatable about an axis perpendicular to the wheel's axis of rotation. A roll speed control assembly 346 may be positioned at the lower end 342 near the first front wheel 344 so as to adjust an amount of tension or resistance of first front wheel 344. An upper end 348 of the first front lower frame member 336 is pivotally coupled with a front section of a pair of first frame connection plates 354 at a joint 356, which may be a pin, rivet, or the like.

A lower end 358 of the second front lower frame member 338 is coupled with a second front wheel 360 that may be locked or fixed in a particular orientation. That is, the second front wheel 360 may rotate such that the walking aid 300 may be utilized to move forward, back, etc., but the second front wheel 360 may be fixed so as to not be rotatable about an axis perpendicular to the wheel's axis of rotation. A roll speed control assembly 362 may be positioned at the lower end 358 near the second front wheel 360 so as to adjust an amount of tension or resistance of the second front wheel 360. An upper end 364 of the second front lower frame member 338 is pivotally coupled with a front section of a pair of second frame connection plates 366 at a joint 368, which may be a pin, rivet, or the like.

Figure 13B:
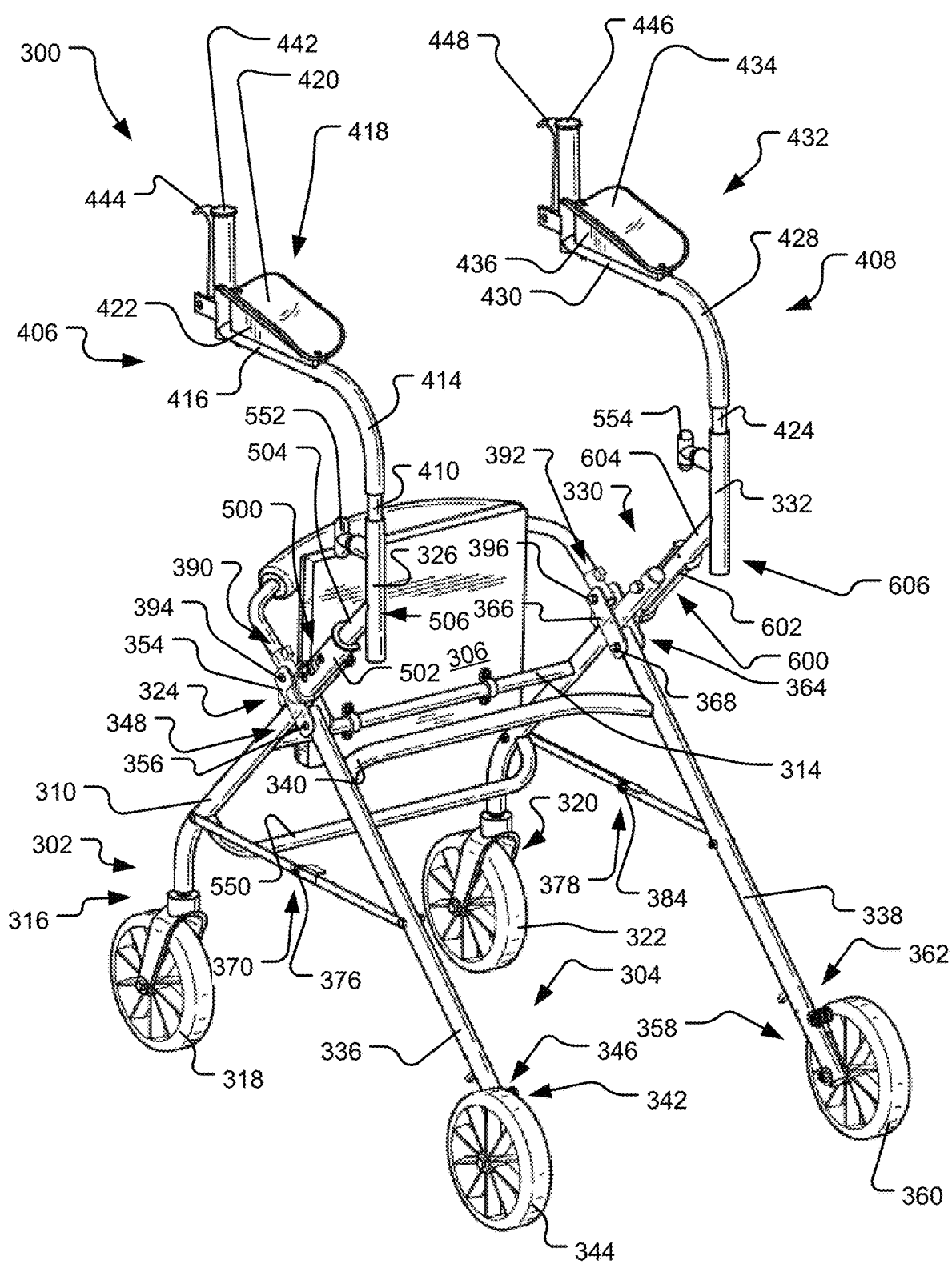
Figure 14D:
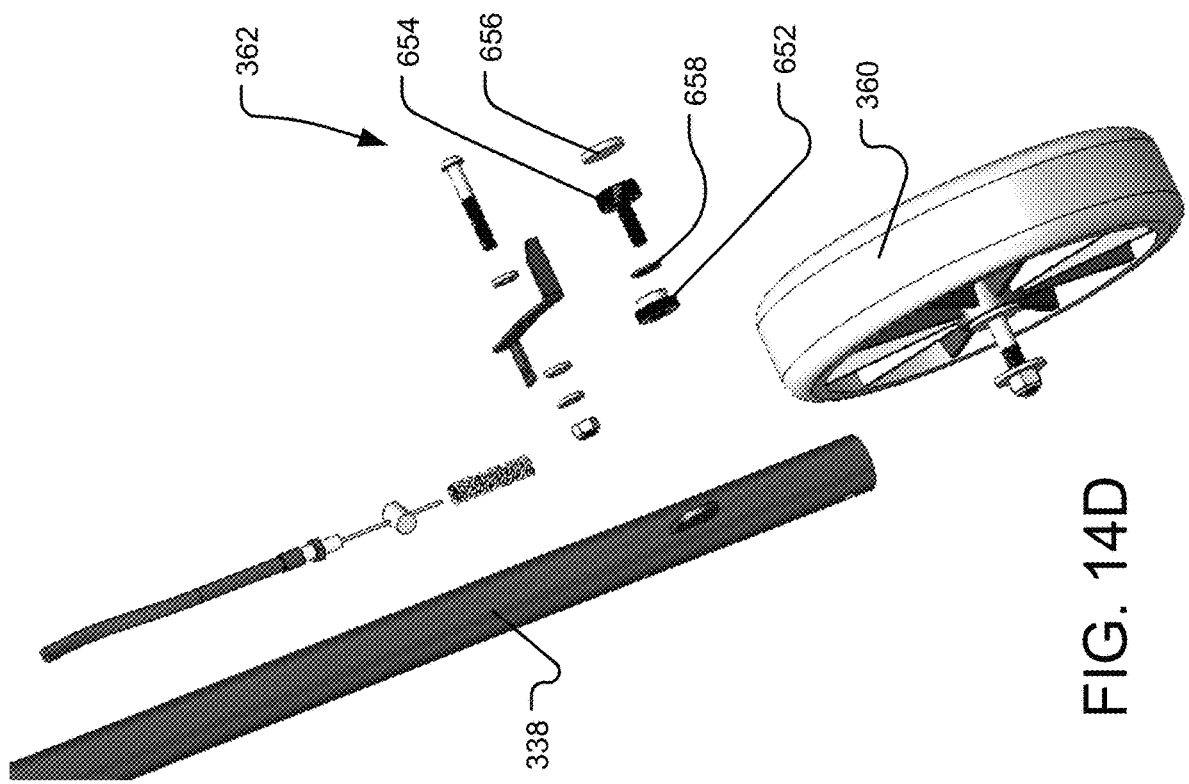
FIGS. 14C and 14D are front and exploded views, respectively, of the front wheel of the walking aid including the roll speed control assembly.
Figure 14C:
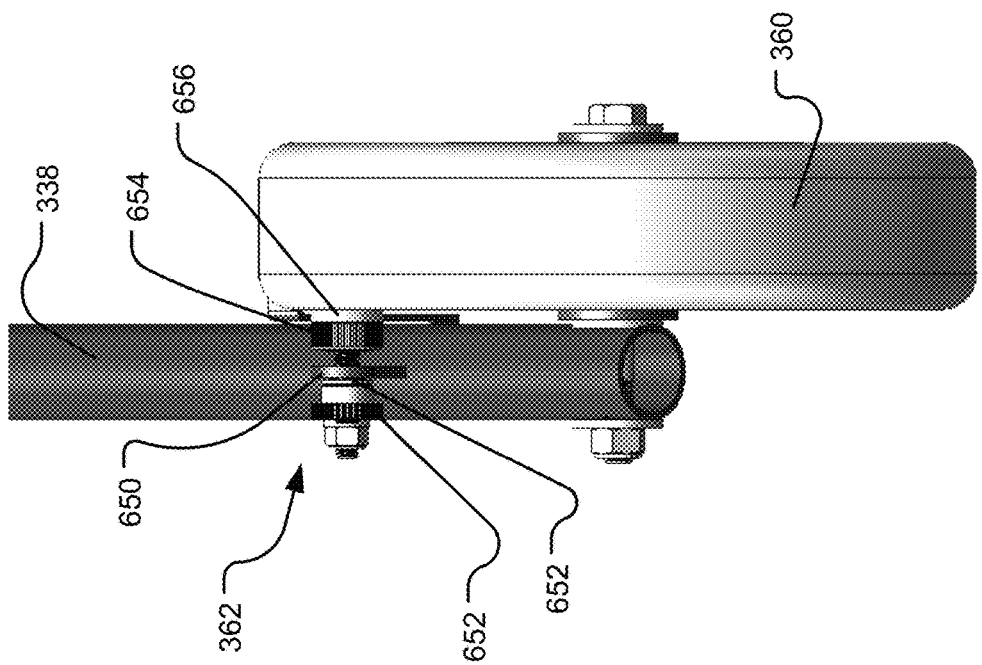

FIG. 13B depicts the walking aid 300 in a second orientation. In this orientation, the walking aid 300 includes all of the previously described parts. The differences from the walking aid 300 in the first orientation is that the first upper frame member 406, and a second upper frame member 408 are rotated one hundred eighty degrees within the first and second tubular members 326, 332, and the seat 306 is pivoted upwards.

Reference is made to FIGS. 14A-14E, which depict various views of the second front lower frame member 338, second wheel 360, and the second roll speed control assembly 362. The components for the first roll speed control assembly 346 may be the same so the discussion will not be duplicated for it. As seen in the figures, the roll speed control assembly 362 is coupled to a tab 650 with a through-bore (e.g., threaded) and that is coupled (e.g., welded) to a front aspect of the second front lower frame member 338. The roll speed control assembly 362 may include a thumb-nut 652 and an internal toothed lock washer 658 on one side of the tab 650 (opposite the wheel side of the tab 650). The thumb-nut 652 is threaded onto a thumb-screw 654 with a felt pad 656 positioned at the head of the thumb-screw. The head of the thumb-screw 654 and felt pad 656 may be positioned on the wheel-side of the tab 650. The felt pad 656 may contact an inner portion of the second wheel 360 with increasing force (increasing resistance for the rotation of the second wheel 360) when the thumb-nut 652 is tightened. Conversely, the felt pad 656 may decrease its force against the wheel (and therefore decrease the resistance of the rotation of the second wheel 360) when the thumb-nut 652 is loosened.

Turning back to the rear lower frame structure 302, as seen in FIGS. 13A and 13B, the first and second rear lower frame member 310, 312 are coupled together below the rear seat support member 314 via a lower support member 550. The lower support member 550 may be curved at the connection ends, and may extend towards the front lower frame structure 304. The lower support member 550 may engage an accessory of the walking aid 300 such as, for example, a basket that may be also coupled to the rear seat support member 314.

The first rear lower frame member 310 extends through the pair of first frame connection plates 354 between the first end 390 of the back support member 388 and the upper end 324 of the first rear lower frame member 310. The back support member 388 may be pivotally coupled with the pair of first frame connection plates 354 at a joint 394, such as a pin, rivet, or the like. On the other side, the second rear lower frame member 312 extends through the pair of second frame connection plates 366 between the second end 392 of the back support member 388 and the upper end 330 of the second rear lower frame member 312. The back support member 388 may be pivotally coupled with the pair of second frame connection plates 366 at a joint 396, such as a pin, rivet, or the like.

The upper frame structure 308 includes a first upper frame member 406, and a second upper frame member 408. The first upper frame member 406 may be L-shaped and includes a lower cylindrical section 410 that is linear with through-holes 412 vertically spaced along the section 410. The first upper frame member 406 also includes a curved transition section 414 and a first forearm section 416 that is linear and generally perpendicular to the lower cylindrical section 410. A first forearm support 418 is coupled to the first forearm section 416. The first forearm support 418 includes a curved support pad 420 for contacting and supporting the user's forearm, and a flared support member 422 positioned between the curved support pad 420 and the first forearm section 416. The flared support member 422 angles the curved support pad 420 so the front end of the pad 420 is farther away from the first forearm section 416 than a rear end of the pad 420. The angle of the curved support pad 420 may vary depending on the height of the user of the walking aid 300. With the first forearm section 416 being generally level or parallel with the floor surface, the curved support pad 420 will cause a user's arm to angle slightly upward from the elbow to the hand.

The first forearm section 416 is coupled with a first handle 442 oriented generally perpendicular to the first forearm section 416. Coupled to the first handle 442 is a brake lever 444 that is linked with a brake at the first front wheel 344.

The second upper frame member 408 may also be L-shaped and includes a lower cylindrical section 424 that is linear with through-holes 426 vertically spaced along the section 424. The second upper frame member 408 also includes a curved transition section 428 and a second forearm section 430 that is linear and generally perpendicular to the lower cylindrical section 424. A second forearm support 432 is coupled to the second forearm section 430. The second forearm support 432 includes a curved support pad 434 for contacting and supporting the user's forearm, and a flared support member 436 positioned between the curved support pad 434 and the second forearm section 430. The flared support member 436 angles the curved support pad 434 so the front end of the pad 434 is farther away from the second forearm section 430 than a rear end of the pad 434. The angle of the curved support pad 434 may vary depending on the height of the user of the walking aid 300. With the first forearm section 430 being generally level or parallel with the floor surface, the curved support pad 434 will cause a user's arm to angle slightly upward from the elbow to the hand.

The second forearm section 430 is coupled with a second handle 446 oriented generally perpendicular to the second forearm section 430. Coupled to the second handle 446 is a brake lever 448 that is linked with a brake at the second front wheel 360.

In order to adjust the height of the upper frame structure 308 relative to the floor surface, the lower cylindrical sections 410, 424 of the first and second upper frame members 406, 408 may be received within the lumens of the first and second tubular member 326, 332, respectively, and first and second pins 552, 554 may be inserted into coaxially aligned through-holes of the lower cylindrical sections 410, 424 and the first and second tubular members 326, 332, respectively. That is, the first and second upper frame members 406, 408 of the upper frame structure 308 are adjustably coupled, respectively, to the first and second rear lower frame member 310, 312 of the rear lower frame structure 302 along lengths of the first and second upper frame members 406, 408. More particularly, the first and second upper frame members 406, 408 of the upper frame structure 308 and the first and second tubular member 326, 332 define a telescoping connection between each other. Adjustment of the height of the upper frame structure 308 does not move the relative fore-aft position of first and second forearm supports 418, 432. That is, the height adjustment of the upper frame structure 308 is accomplished in the vertical direction only.

Reference is made to the pivot mechanisms 500, 600 of FIGS. 15A-15J. And while FIGS. 15A-15J depict the first pivot mechanism 500, the discussion is equally applicable to the second pivot mechanism. The pivot mechanisms 500, 600 include first and second cuff members 502, 602 that engage the first and second lower members 504, 604 of the first and second upper arm assemblies 506, 606. The first and second cuff members 502, 602 may be referred to as grips or grip members as they are to be gripped by the user when actuating the pivot mechanism.

The first lower member 504 is coupled with the first upper tubular member 326 of the first upper arm assembly 506. And the second lower member 604 is coupled with the second upper tubular member 332 of the second upper arm assembly 606. As seen in the exploded view of FIG. 15B, the first and second cuff members 502, 602 each include an elongated slot 508, 608, an upper through-bore 510, 610, and a lower through-bore 512, 612, where the elongated slot 508, 608 is positioned between the upper and lower through-bores. As seen in FIGS. 15A and 15B, among others, the pivot mechanisms 500, 600 each include a pin 514, 614 (e.g., a steel pin) that also includes an elongated slot 516, 616, an upper threaded through-bore 518, 618, and a lower threaded through-bore 520, 620. The pins 514, 614 are coupled in a fixed position to their respective cuff member 502, 602 via fasteners (e.g., bolts, screws) 522, 622 that extend through the upper and lower through-bores 510, 610, 512, 612 of the cuff members 502, 602 and threadably engage the upper and lower though-bores 518, 618, 520, 620 of the pins 514, 614. Springs 524, 624 are positioned on an upper end of the pins 514, 614. A lower end of each of the pins 514, 614 is chamfered. The springs 524, 624 and the pins 514, 614 are fitted within the lumens or openings of the first and second lower members 504, 604. The springs 524, 624 may be restrained from movement via a pin 532, 632, as seen in FIG. 15B, extending across the lumens.

The pivot mechanism 500, 600 further include an elongated threaded member 526, 626 extending through the elongated slots 508, 608, 516, 616 of the cuff members 502, 602 and the pins 514, 614, as seen in FIG. 15C. The threaded end of the elongated threaded members 526, 626 extend through the upper end 330 of the second rear lower frame member 312, and the upper end 324 of the first rear lower frame member 310, respectively. The threaded ends of the elongated threaded members 526, 626 are threaded onto threaded end caps 528, 628. The first and second upper arm assemblies 506, 606 may pivot about the elongated threaded members 526, 626.

As seen in FIG. 15D, among others, the upper ends 330, 324 of the second and first rear lower frame members 312, 310 each include a tubular pin receptacle 530, 630 coupled thereto, respectively. The tubular pin receptacles 530, 630 may receive the chamfered lower ends of the pins 514, 614 therein to lock the first and second upper arm assemblies 506, 606 in an upright position (i.e., suitable for bearing weight of a user) relative to the first and second lower frame members 310, 312.

Figure 15G:
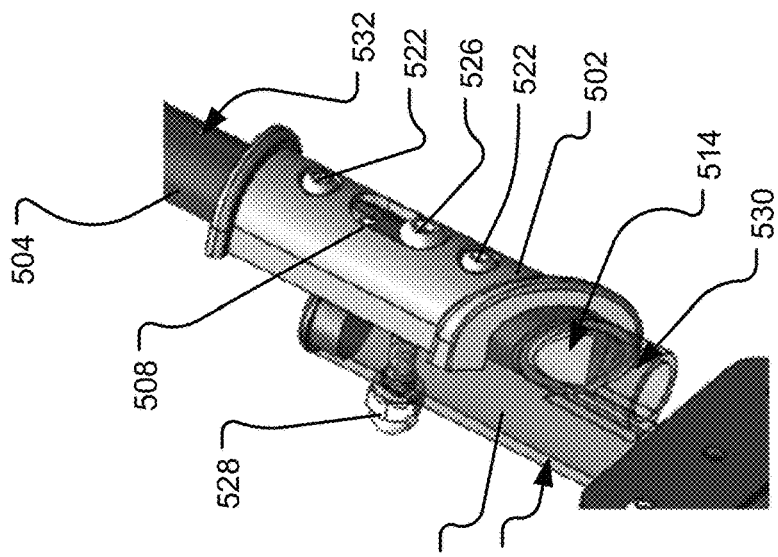
FIG. 15G is an isometric close-up view of the first pivot assembly with the upper end of the first rear lower frame member shown semi-transparent, and with the pin compressed against the spring so as to free the pin from the tubular pin receptacle.
Figure 15F:
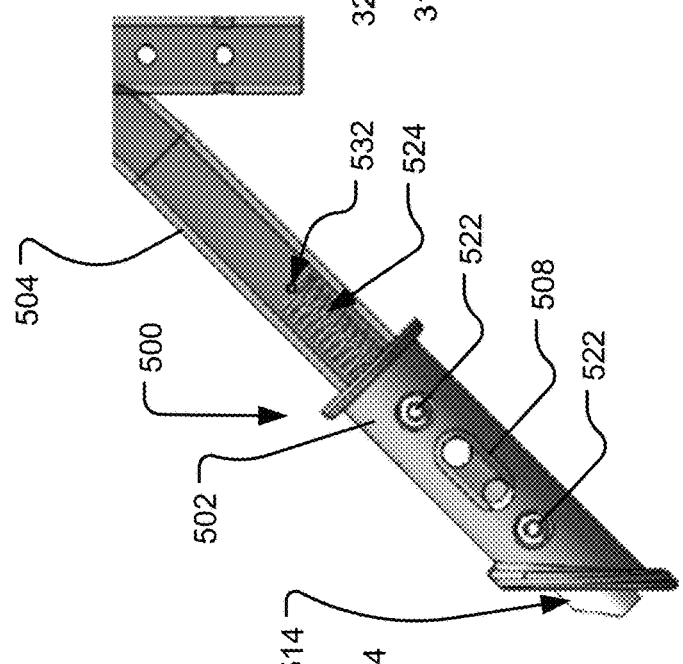
FIG. 15F is a side view, opposite that of FIG. 15E, of the first pivot assembly with the first upper arm assembly shown semi-transparent in order to see the pin and spring positioned therein.
Figure 15E:
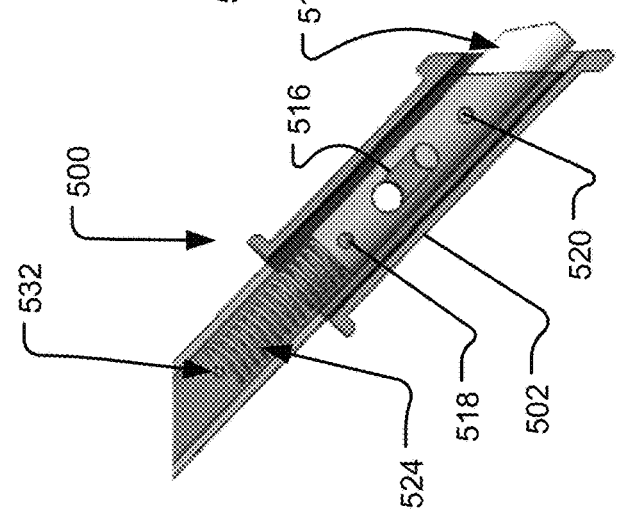
FIG. 15E is a side view of the first pivot assembly with the first upper arm assembly shown semi-transparent in order to see the pin and spring positioned therein.

The springs 524, 624 may bias the pins 514, 614 in a downward trajectory such that a counteracting force (i.e., from the user) must be applied to the first and second cuff members 502, 602 in an upward direction (such as seen in FIG. 15G) till the chamfered lower end of the pins 514, 614 exits the tubular pin receptacles 530, 630, in which case the first and second upper arm assemblies 506, 606 are permitted to rotate about the elongated threaded members 526, 626, as seen in FIG. 15D.

Figure 16:
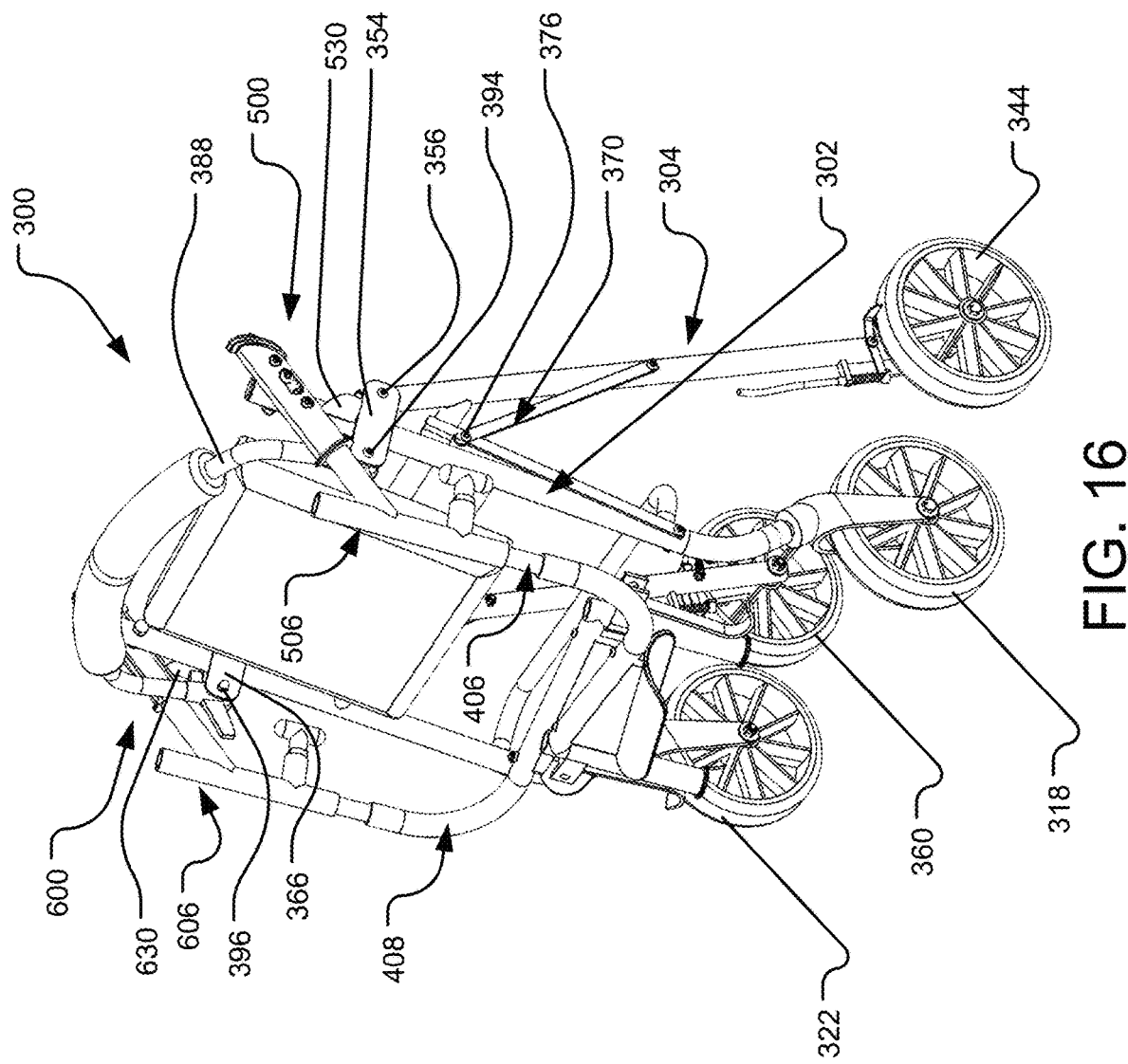
FIG. 16 is an isometric back view of the walking aid in the folded orientation.

Reference is made to FIGS. 16, which are various views of the walking aid 300 in a folded, stowed, or stored position. In particular, the walking aid 300 may be pivoted or folded about the joints 356, 368 of the first and second frame connection plates 354, 366 such that the rear lower frame structure 302 and the front lower frame structure 304 move closer together or converge. To permit this pivoting, the first and second folding struts 370 (378 not seen in FIG. 16) also collapse or pivot about their respective joints 376 (384 not seen in FIG. 16). As seen in the figure, the back support member 388 may be pivoted about the joints 394, 396 at the rear of first and second frame connection plates 354, 366. Additionally, the pivot mechanisms 500, 600 may be in a disengaged state such that the pins 514, 614 (not seen in FIG. 16) are disengaged with or not within the tubular pin receptacles 530, 630, permitting the first and second upper arm assemblies 506, 606 to pivot relative to the rear lower frame structure 302. Additionally, as seen in FIG. 16, the first upper frame member 406, and the second upper frame member 408 are rotated inward, relative to each other.

In the folded position, seen in FIGS. 16, the walking aid 300 may be transported by rolling the walking aid 300 on the front wheels 344, 360 or carried. As seen in the figures, the front wheels 344, 360 are positioned outside of the rear wheels 318, 322 such that the front wheels 344, 360 are still rotatable.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above. Further, reference to "first" and "second" may also be considered "right" and "left" or vice versa.

What is claimed is:

1. A walking aid that assists a user in walking in an upright position, the user having elbows, hands, and first and second forearms, the walking aid comprising:

a collapsible lower frame structure comprising a lower end and an upper end, the collapsible lower frame structure coupled with four wheels at the lower end thereof, the upper end comprising a first tubular member and a second tubular member;

an upper frame structure coupled to the collapsible lower frame structure and comprising:

a first upper frame member comprising a first upper support section and a first vertical section that bends into the first upper support section, the first vertical section in overlapping engagement with the first tubular member of the collapsible lower frame structure and configured to be secured to the first tubular member in a first walking orientation and a second walking orientation that is opposite of the first walking orientation;

a second upper frame member comprising a second upper support section and a second vertical section that bends into the second upper support section, the second vertical section in overlapping engagement with the second tubular member of the collapsible lower frame structure and configured to be secured to the second tubular member in the first walking orientation and the second walking orientation;

a first forearm support coupled to the first upper support section of the first upper frame member, the first forearm support being at a first fixed angle relative to the first vertical section, the first angle being obtuse, wherein, in both the first walking orientation and the second walking orientation, a first angle of the first forearm support relative to a horizontal plane is the same; and a second forearm support coupled to the second upper support section of the second upper frame member, the second forearm support being at a second fixed angle relative to the second vertical section, the second angle being obtuse, wherein, in both the first walking orientation and the second walking orientation, a second angle of the second forearm support relative to the horizontal plane is the same; and a seat operably coupled to the collapsible lower frame structure.

2. The walking aid of claim 1, wherein the seat is configured to be positioned behind the user when the first and second upper frame members are oriented in the first walking orientation and when the first and second forearm supports support the first and second forearms of the user, and wherein the seat is configured to be positioned in front of the user when the first and second upper frame members are oriented in the second walking orientation and when the first and second forearm supports support the first and second forearms of the user.

3. The walking aid of claim 1, wherein the first upper frame member is vertically adjustable relative to the first tubular member, and the second upper frame member is vertically adjustable relative to the second tubular member.

4. The walking aid of claim 1, wherein the collapsible lower frame structure comprises a first frame structure that is pivotally joined with a second frame structure via first and second folding joints, the first frame structure coupled with a first pair of wheels of the four wheels, the second frame structure coupled with a second pair of wheels of the four wheels.

5. The walking aid of claim 1, further comprising a first handle coupled to the first upper frame member; and a second handle coupled to the second upper frame member.

6. The walking aid of claim 1, wherein the first vertical section of the first upper frame member is rotatable about the first tubular member about a first axis extending through the first tubular member, and the second upper frame member is rotatable about the second tubular member about a second axis extending through the second tubular member.

7. The walking aid of claim 6, wherein the overlapping engagement of the first vertical section and the first tubular member comprises the first vertical section being received within the first tubular member, and wherein the overlapping engagement of the second vertical section and the second tubular section comprises the second vertical section being received within the second tubular member.

8. The walking aid of claim 6, wherein each of the first axis and the second axis are normal to the horizontal plane.

9. The walking aid of claim 6, wherein, in both the first walking orientation and the second walking orientation, the first axis does not intersect first forearm support and the second axis does not intersect the second forearm support.

10. The walking aid of claim 9, wherein the first axis and the second axis are normal to the horizontal plane.

11. The walking aid of claim 1, wherein a difference between the first walking orientation and the second walking orientation is a one hundred eighty-degree difference in angular orientation of: the first vertical section of the first upper frame member relative to the first tubular member; and the second vertical section of the second upper frame member relative to the second tubular member.

* * * * *